United States Patent
Jasmin et al.

(10) Patent No.: US 10,211,773 B2
(45) Date of Patent: Feb. 19, 2019

(54) HEIGHT-ADJUSTABLE SOLAR PANEL MOUNTING DEVICE

(71) Applicant: Sunmodo Corporation, Vancouver, WA (US)

(72) Inventors: Roland Jasmin, Lake Oswego, OR (US); Jun Liu, Camas, WA (US)

(73) Assignee: Sunmodo Corporation, Vancouver, WA (US)

(*) Notice: Subject to any disclaimer, the term of this patent is extended or adjusted under 35 U.S.C. 154(b) by 140 days.

(21) Appl. No.: 15/604,623

(22) Filed: May 24, 2017

(65) Prior Publication Data

US 2018/0342974 A1 Nov. 29, 2018

(51) Int. Cl.
| | |
|---|---|
| H02S 20/23 | (2014.01) |
| H02S 20/30 | (2014.01) |
| F16B 5/02 | (2006.01) |
| F16B 5/00 | (2006.01) |
| F16B 5/06 | (2006.01) |

(52) U.S. Cl.
CPC ............ *H02S 20/23* (2014.12); *F16B 5/0088* (2013.01); *F16B 5/0225* (2013.01); *F16B 5/0233* (2013.01); *F16B 5/0266* (2013.01); *F16B 5/0635* (2013.01); *H02S 20/30* (2014.12); *F16B 2005/0678* (2013.01)

(58) Field of Classification Search
CPC ......... H02S 20/23; Y02B 10/12; Y02E 10/47; F24S 25/636
See application file for complete search history.

(56) References Cited

U.S. PATENT DOCUMENTS

| | | |
|---|---|---|
| 5,501,754 A | 3/1996 | Hiraguri |
| 7,435,134 B2 | 10/2008 | Lennox |
| 7,827,656 B2 | 11/2010 | Schweikert |
| 8,136,311 B2 | 3/2012 | Liu |
| 8,176,693 B2 | 5/2012 | Abbott et al. |
| 8,480,330 B2 | 7/2013 | Urban et al. |

(Continued)

FOREIGN PATENT DOCUMENTS

| | | |
|---|---|---|
| AU | 2010200545 A1 | 2/2010 |
| DE | 102005002828 A1 | 8/2006 |

(Continued)

OTHER PUBLICATIONS

Solar panel mounting system, solar mounting bracket, solar panel adjustable end clamps, Xiamen Empery Machinery & Electronics Co., Ltd., Accessed on the Internet at: http://www.alibaba.com/product-detail/Solar-panel-mounting-system-solar-mounting_1900136975.html on Apr. 4, 2016.

(Continued)

*Primary Examiner* — Brian E Glessner
*Assistant Examiner* — Daniel J Kenny
(74) *Attorney, Agent, or Firm* — Stone Creek Services LLC; Alan M Flum

(57) ABSTRACT

A solar panel mounting device that allows for position adjustment along a base mountable to a roof surface and height-adjustment relative to the roof surface. The solar panel mounting device includes a height-adjuster and a dual-locking mechanism separate from the height-adjuster. The dual-locking mechanism acts as a guide surface during level adjustment and can separately lock the position adjustment and height-adjustment upper limit.

16 Claims, 18 Drawing Sheets

(56) References Cited

U.S. PATENT DOCUMENTS

| | | | |
|---|---|---|---|
| 8,683,761 | B2 | 4/2014 | Danning |
| 8,746,646 | B2 | 6/2014 | Fluhrer et al. |
| 8,938,932 | B1 | 1/2015 | Wentworth et al. |
| 8,943,765 | B2 | 2/2015 | Danning et al. |
| 9,080,792 | B2 | 7/2015 | Patton et al. |
| 9,097,443 | B2 | 8/2015 | Liu et al. |
| 9,175,878 | B2 | 11/2015 | Kemmer et al. |
| 9,431,953 | B2 | 8/2016 | Stearns et al. |
| 9,455,662 | B2 | 9/2016 | Meine |
| 9,473,066 | B2 | 10/2016 | Stephan et al. |
| 9,647,433 | B2 | 5/2017 | Meine et al. |
| 10,097,132 | B2 * | 10/2018 | Stearns .................. H02S 20/23 |
| 2008/0244881 | A1 | 10/2008 | Zante |
| 2011/0138585 | A1 | 6/2011 | Kmita et al. |
| 2011/0214365 | A1 | 9/2011 | Aftanas |
| 2012/0102854 | A1 | 5/2012 | Meier et al. |
| 2012/0222273 | A1 | 9/2012 | Abbott et al. |
| 2013/0048816 | A1 | 1/2013 | Wentworth et al. |
| 2013/0161462 | A1 | 6/2013 | Haddock |
| 2013/0200245 | A1 | 8/2013 | Markiewicz et al. |
| 2014/0041706 | A1 | 2/2014 | Haddock et al. |
| 2014/0042286 | A1 | 2/2014 | Jaffari |
| 2014/0174510 | A1 | 6/2014 | Kanbara |
| 2014/0202525 | A1 | 7/2014 | Janssens et al. |
| 2015/0101997 | A1 | 4/2015 | Liu et al. |
| 2015/0102194 | A1 | 4/2015 | Liu |
| 2015/0129517 | A1 | 5/2015 | Wildes |
| 2015/0168021 | A1 | 6/2015 | Wentworth et al. |
| 2015/0288320 | A1 | 10/2015 | Stearns et al. |
| 2015/0311606 | A1 | 10/2015 | Meine et al. |
| 2016/0043689 | A1 | 2/2016 | McPheeters |
| 2016/0069592 | A1 | 3/2016 | Giraudo et al. |
| 2016/0142006 | A1 | 5/2016 | Meine et al. |
| 2016/0233820 | A1 | 8/2016 | Redel |
| 2016/0248369 | A1 | 8/2016 | Almy |
| 2016/0268958 | A1 | 9/2016 | Wildes et al. |
| 2016/0308487 | A1 | 10/2016 | Molina et al. |
| 2017/0025987 | A1 | 1/2017 | Stearns et al. |
| 2017/0040931 | A1 | 2/2017 | Schuit et al. |
| 2017/0063288 | A1 | 3/2017 | Schuit et al. |
| 2017/0102167 | A1 | 4/2017 | Stephan et al. |
| 2017/0104442 | A1 | 4/2017 | McRostie et al. |

FOREIGN PATENT DOCUMENTS

| | | |
|---|---|---|
| DE | 202006008867 U1 | 12/2007 |
| DE | 202011107843 U1 | 1/2012 |
| DE | 202012006839 U1 | 10/2012 |
| DE | 202014009489 U1 | 1/2015 |
| JP | 2004060358 A | 2/2004 |
| JP | 3175796 U3 | 5/2012 |
| WO | 201332470 A1 | 3/2013 |

OTHER PUBLICATIONS

Tough Trac Lite Rail Installation Manual, Nov. 2014, p. 11, Touch Trac, Holbrook, NY.

Tough Trac Continuous Array Portrait Installation Manual, Jul. 2011, pp. 8-9, Touch Trac, Holbrook, NY.

Solar Panel mounting adjustable end Clamps/Solar Panel Clamps/Solar clamps kits, Xiamen Grace Solar Technology Co., Ltd., Accessed on the Internet at: racesolar.en.alibaba.com/product/551736946-220766304/Solar_Panel_mounting_adjustable_end_Clamps_Solar_Panel_Clamps_Solar_clamps_kits.html on Apr. 4, 2016.

Training on how to install Lock Solar, solar mounting products, Nov. 2013, p. 14, Lock Solar Pty. Ltd., Brisbane, Australia.

Chiko End Clamp, Accessed on the Internet at: http://www.alphaenergy.com.au/Solar-Power/CHIKO-SOLAR-RACKING-ACCESSORIES on Apr. 4, 2016.

New Product Introduction—Self Grounding System, Oct. 2014, Sunmodo Corporation, Vancouver, WA.

Unirac Product Drawings: SFM-A01, SFM-A02, SFM-A03, SFM-A04, SFM-A05, SFM-P01, SFM-P02, SFM-P03, SFM-P04, SFM-P05, SFM-P06, Feb. 2017, Unirac, Inc. Albuquerque, New Mexico, U.S.

Cut Sheet—Rock-it 2.0 Coupling, Sep. 2016, EcoFastener Solar, Morrisville, Vermont, U.S.

Cut Sheet—Rock-it 2.0 Mount, Sep. 2016, EcoFastener Solar, Morrisville, Vermont, U.S.

Rock-it System 2.0 Rail Free Solar Mount, Mar. 2017, EcoFastener Solar, Morrisville, Vermont, U.S.

Sun Frame Microrail Installation Guide, Feb. 2016, EcoFastener Solar, Morrisville, Vermont, U.S.

U.S. Appl. No. 15/130,913, (Unpublished ),"Adjustable End Clamp for Mounting Solar Panels to Roofs," Inventor: Jun Liu, Applicant: Sunmodo Corporation, filed Apr. 15, 2016, United States Patent and Trademark Office, Alexandra, Virginia U.S.

Non-Final Office Action, U.S. Appl. No. 15/130,913, (Unpublished ), dated Feb. 24, 2017, "Adjustable End Clamp for Mounting Solar Panels to Roofs," Inventor: Jun Liu, Applicant: Sunmodo Corporation, filed Apr. 15, 2016, United States Patent and Trademark Office, Alexandra, Virginia U.S.

Notice of Allowance, U.S. Appl. No. 15/130,913, (Unpublished ), "Adjustable End Clamp for Mounting Solar Panels to Roofs," dated Mar. 30, 2017, Inventor: Jun Liu, Applicant: Sunmodo Corporation, filed Apr. 15, 2016, United States Patent and Trademark Office, Alexandra, Virginia U.S.

* cited by examiner

HEIGHT-ADJUSTABLE SOLAR PANEL MOUNTING DEVICE

BACKGROUND

This disclosure relates to a device for mounting solar panels to roofs of building structures.

Solar Panels can mount to various types of roof structures, such as pitched shingle roofs, tile roofs, metal roofs, or concrete roofs. Solar panels commonly secure to rails. Typically, these rails span the length of one or more solar panels. L-foot brackets and other mounting systems can secure the rails to the roof. The L-foot brackets often include slots to adjust the height of the rail with respect to the roof surface. Some rail-mounted solar panel mounting devices are slidable along the rail. This allows the installer to adjust the position of the solar panel along the roof-line and position the solar panel with respect to other solar panels.

Solar panel installers and manufacturers seek to simplify installation and minimize system costs. One alternative to a rail-based system that attempts to do this is a rail-less solar panel mounting system. Rather than a rail that spans the length or width of one or more solar panels, a rail-less solar panel mounting system typically includes mounting devices positioned periodically along the roof surface to support the solar panels. Rail-less solar panel mounting systems are potentially simpler than their rail-based counterparts. They do not require long spans of rail. However, rail-less solar panel mounting systems are not without their challenges. With a rail-based system, the rails can be positioned and leveled before the heavy solar panels are mounted. In a rail-less system the solar panels often must be attached to the mounting devices before they can be adjusted. To overcome this challenge, manufacturers have developed various strategies to adjust the position and height of the mounting hardware.

SUMMARY

The inventors recognized while designing and implementing prototypes of a rail-less solar panel mounting system that current height-adjustment mechanisms can create challenges. The height-adjustment mechanism can potentially be difficult because the position of the solar panels and mounting hardware can impede access to the adjustment mechanism. In addition, the inventors discovered that there were potential issues with uplift forces on the panels. Uplift forces typically can occur during windstorms and tropical cyclones.

To address these issues, the inventor developed a solar panel mounting device, with a height-adjuster and a dual-locking mechanism separate from the height-adjuster. The solar panel mounting device includes an upper assembly that supports the solar panels and is slidable along a base to adjust the position of the solar panel along the roof-line. The height-adjustment mechanism threadably engages a portion of the upper assembly causing it to separate and extend upward from the base and the roof. The dual-locking mechanism can separately lock slidability and set maximum height-adjustment.

The inventor's solar panel mounting device described in this disclosure offers several advantages over existing rail-less solar panel mounting systems. First, the maximum upward height-adjustment is lockable, and once locked, prevents upward movement of the solar panel. This helps prevent uplift and loosening during wind storms. Second, the height-adjustment and roof-line adjustment (i.e. sliding adjustment) are separately adjustable using the dual-locking mechanism. Third, the dual-locking mechanism is separate from the height-adjuster simplifying use. Fourth, the height-adjuster and dual-locking mechanism are positioned on opposing sides of the center-line of the solar panel mounting device. This allows strategic positioning of the height-adjuster and the dual-locking for easy adjustment after the solar panel is in place. In comparison, existing systems typically have the height-adjuster positioned along the center-line of the mounting hardware. In addition, the dual-locking mechanism, provides an additional benefit of providing a stabilizing secondary support surface for the upper assembly as the height-adjuster threadably engages the upper assembly.

In one embodiment, the upper assembly can include a platform that receives the solar panel, a pedestal, and a slider that captively slides along the length-wise direction of the base. The platform can mount the solar panel and the solar panel can be secured to the platform by an end-clamp, mid-clamp, hook, bottom-clamp, or some other clamping mechanism. The upper assembly includes a height-adjuster that adjusts the height of the solar panel, platform, and pedestal relative the roof surface. The height-adjuster can include a threaded portion that threadably engages a threaded aperture in the pedestal, a non-threaded portion that freely engages a non-threaded aperture in the pedestal, and a tool-engaging portion. The height-adjuster can vertically pass through an aperture in the slider and is upwardly constrained. For example, a retainer, such as a nut, clip, or cotter pin, can upwardly constrain the height-adjuster. As the height-adjuster turns, it threadably engages the pedestal, remains fixed to the slider via the retainer, and moves the pedestal with respect to the base and the slider.

The dual-locking mechanism locks and unlocks height-adjustment, separately locks and unlocks slidably of the upper assembly along the base, and helps stabilize height-adjustment. Like the height-adjuster, the dual-locking mechanism can be positioned vertically through the upper assembly. The height-adjuster and the dual-locking mechanism can be positioned on opposing sides of the center-line of the solar panel mounting device to provide the possibility of easier adjustment as compare with a centered mechanism, especially once the solar panels are positioned in place. The dual-locking mechanism can include a threaded fastener, a threaded retainer, and a through-hole standoff. The threaded fastener can include a tool-engaging portion such as an Allen-head, Philips, torx, or another tool-engaging pattern. The threaded fastener can be a threaded rod with tool-engaging portion, such as a slot head, Allen-head, or torx, or Philips head. The through-hole standoff can include a hollow threaded interior through-hole, an unthreaded exterior body, and a tool receiving head. The through-hole standoff threadably engages the threaded fastener and with its outside surface freely engaging the pedestal through an unthreaded aperture.

The threaded retainer can be slidably captive within an upward-facing channel of the base. The threaded retainer threadably engages the threaded fastener and captures the threaded retainer in slidable cooperation within a lower cavity of the upward-facing channel. The threaded retainer can have any shape that keeps it from rotating within the lower cavity of the upward-facing channel and any size that is wider than the channel opening above the lower cavity. For example, the threaded retainer can have a rectangular or parallelogram profile placed length-wise within lower cavity.

In summary, in the above embodiment, to unlock movement of the upper assembly along the base, the dual-locking mechanism engages the threaded retainer but does not engage the bottom of the lower cavity so the upper assembly is free to move along the rail. To lock the movement of the upper assembly along the base, the dual-locking mechanism engages the threaded retainer and the bottom of the lower cavity to prevent the slider from moving along the base. Positioning the head of the through-hole standoff above the pedestal unlocks the height-adjustment. Positioning head of the through-hole standoff against the top of the pedestal limits further upward height-adjustment.

This Summary introduces a selection of concepts in simplified form described in the Description. It is not the intent or purpose of this Summary to identify essential features or limit the scope of the claimed subject matter.

DRAWINGS

DESCRIPTION

The terms "left," "right," "top," "bottom," "upper," "lower," "front," "back," and "side," are relative terms used throughout the to help the reader understand the figures. Unless otherwise indicated, these do not denote absolute direction or orientation and do not imply a preference. The purpose of specification dimensions, when given, is to help the reader understand the scale and advantage of the disclosed material. Dimensions given are typical and do not restrict the claimed invention to the recited dimensions.

Figure 1:
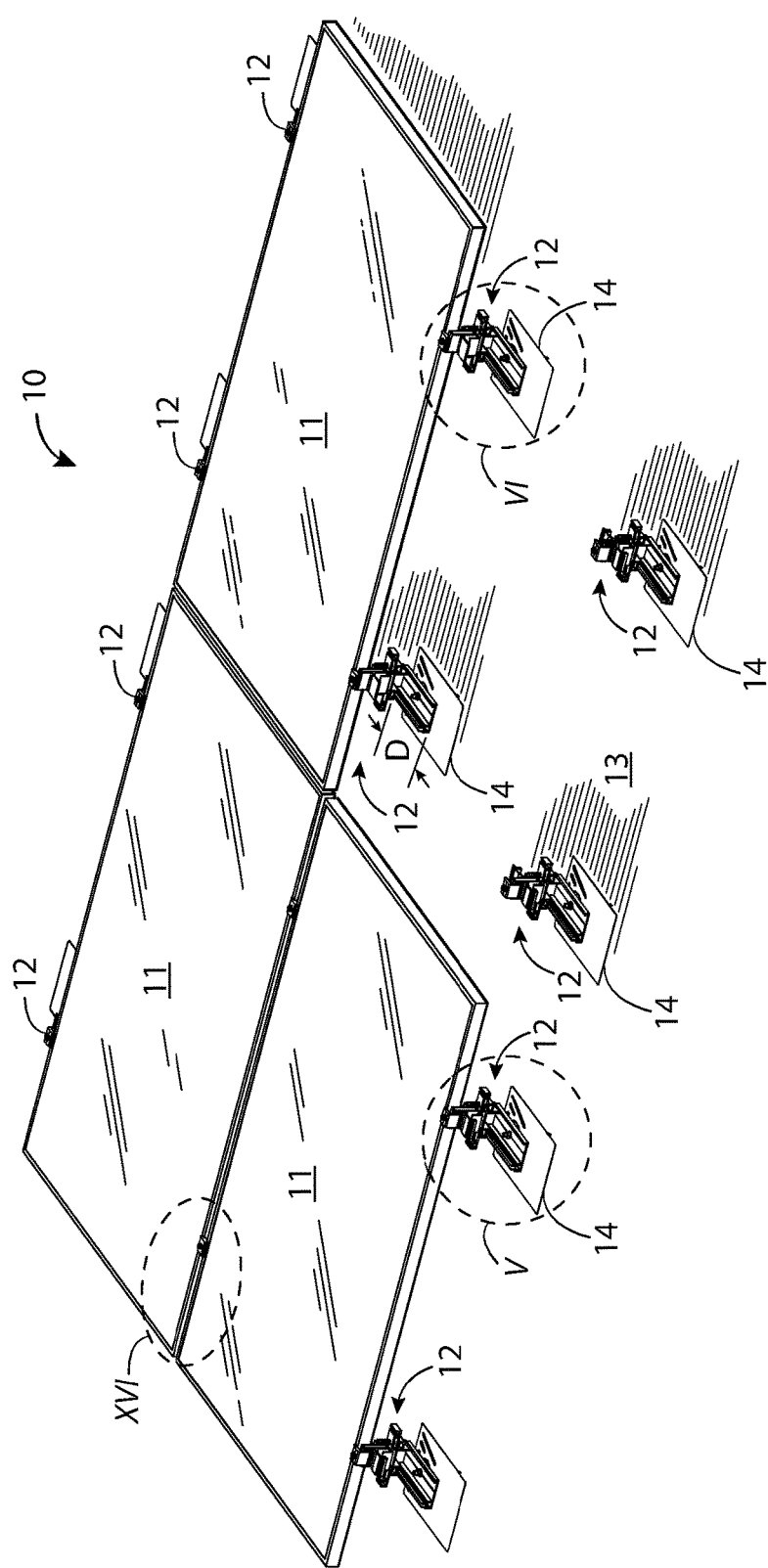
FIG. 1 illustrates a solar panel mounting system of the present disclosure, in top perspective view, showing solar panels mounted to a roof surface with a solar panel removed to reveal several solar panel mounting devices.

The following description references the figures, where like numerals refer to like elements throughout the several views, FIG. 1 illustrates a solar panel mounting system 10 of the present disclosure, in top perspective view, showing solar panels 11 mounted to a roof surface 13 with a solar panel 11 removed on the lower right side of the figure to reveal several of the solar panel mounting devices 12. The solar panel mounting devices 12, as illustrated, are rail-less mounting devices, meaning that they engage the solar panels 11 and attach to the roof surface 13 without mounting rails. The solar panel mounting devices 12 can engage the roof surface 13 via flashing 14, as illustrated.

Figure 2:
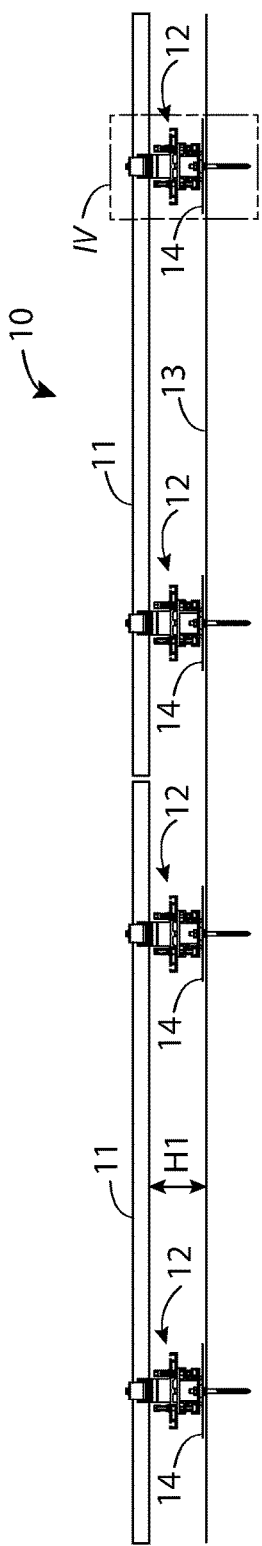
FIG. 2 illustrates a front elevation view of the solar panel mounting system of FIG. 1.
Figure 3:
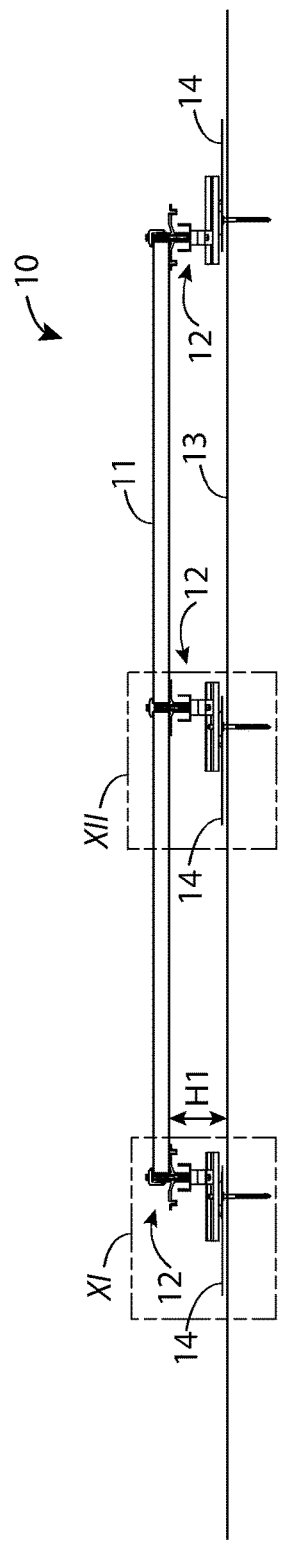
FIG. 3 illustrates a side elevation view of the solar panel mounting system of FIG. 1

FIG. 2 illustrates a front elevation view of the solar panel mounting system 10 of FIG. 1. FIG. 3 illustrates a side elevation view of the solar panel mounting system 10 of FIG. 1. FIGS. 2 and 3 show the solar panels 11 positioned at height H1 above the roof surface 13. The solar panel mounting devices 12 can adjust this height. Referring to FIGS. 1 and 3, the solar panel mounting device 12 can control the position of the panels along one direction of the roof surface 13. The line D, in FIG. 1 designates this positional movement.

Figure 12:
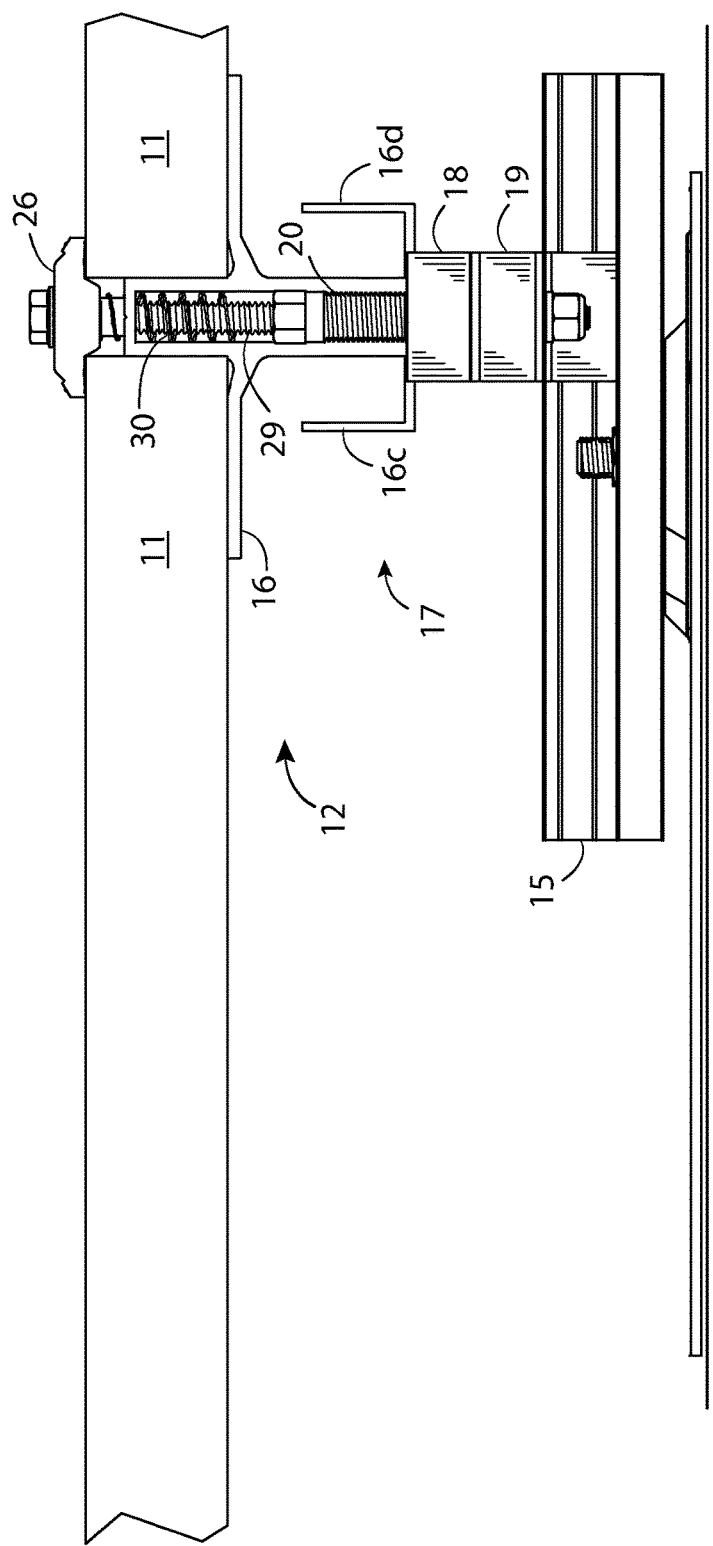
FIG. 12 illustrates an enlarged partial view of FIG. 3 taken along boundary XII.
Figure 13:
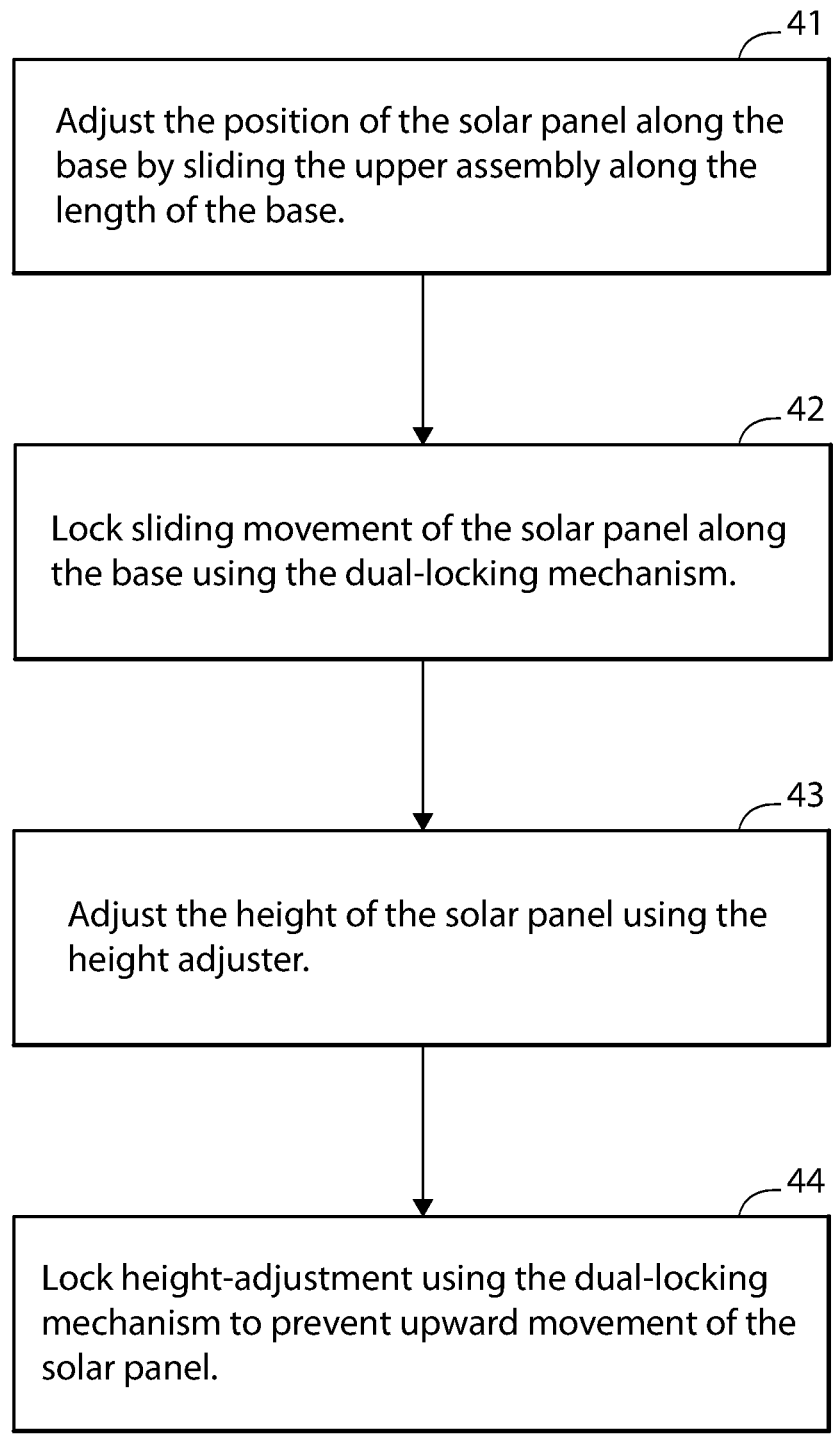
FIG. 13 illustrates a flow chart outlining a set of steps for adjusting the height and slidable position of the solar panel mounting device corresponding to FIGS. 4A-5B.
Figure 14:
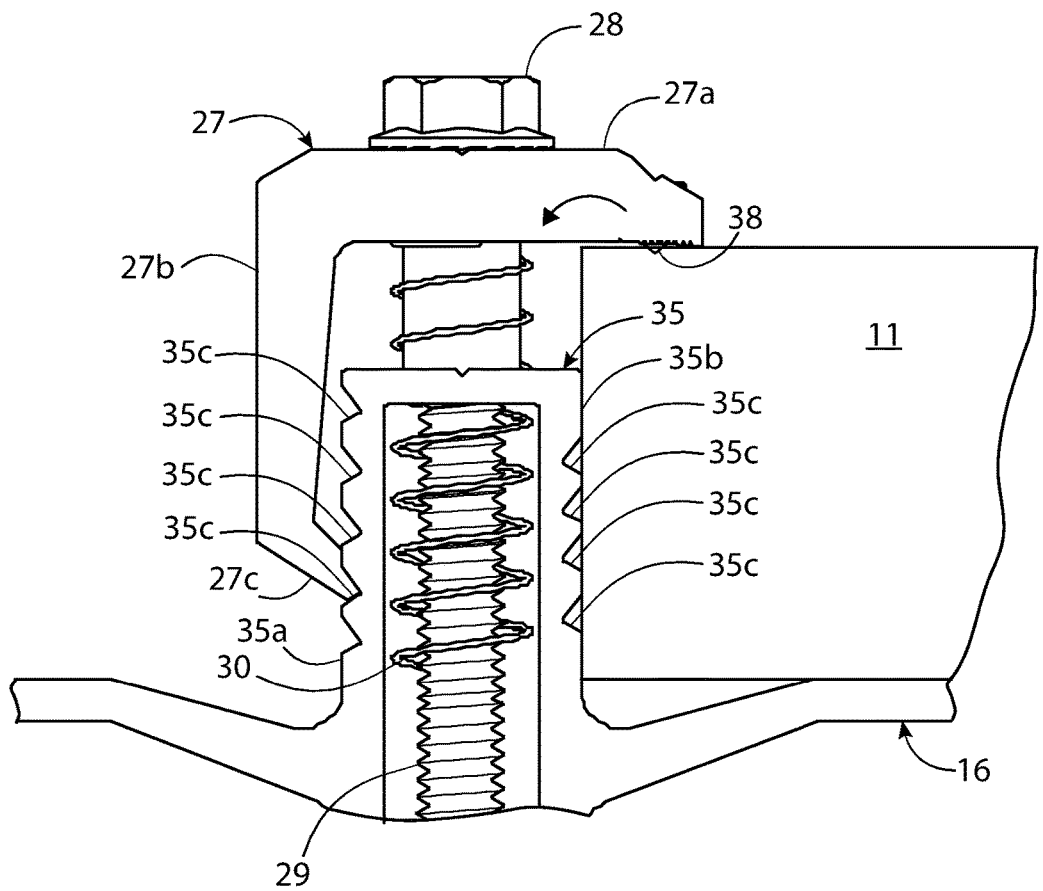
FIG. 14 illustrates and enlarged partial view of FIG. 11 taken along boundary XIV showing the end-clamp assembly in greater detail.
Figure 15:
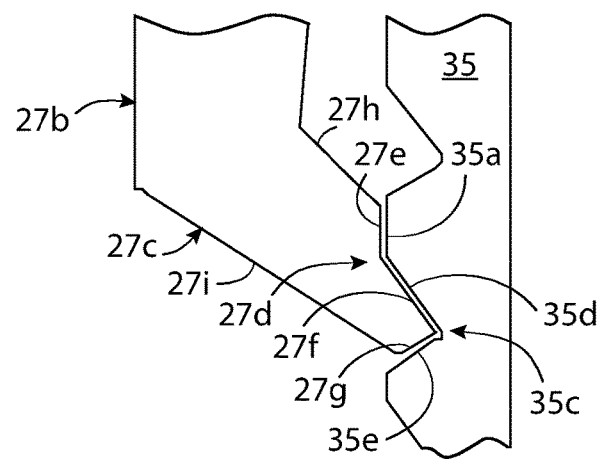
FIG. 15 illustrates an enlarged partial view of FIG. 14 showing the three-angled bearing surface in greater detail.
Figure 16:
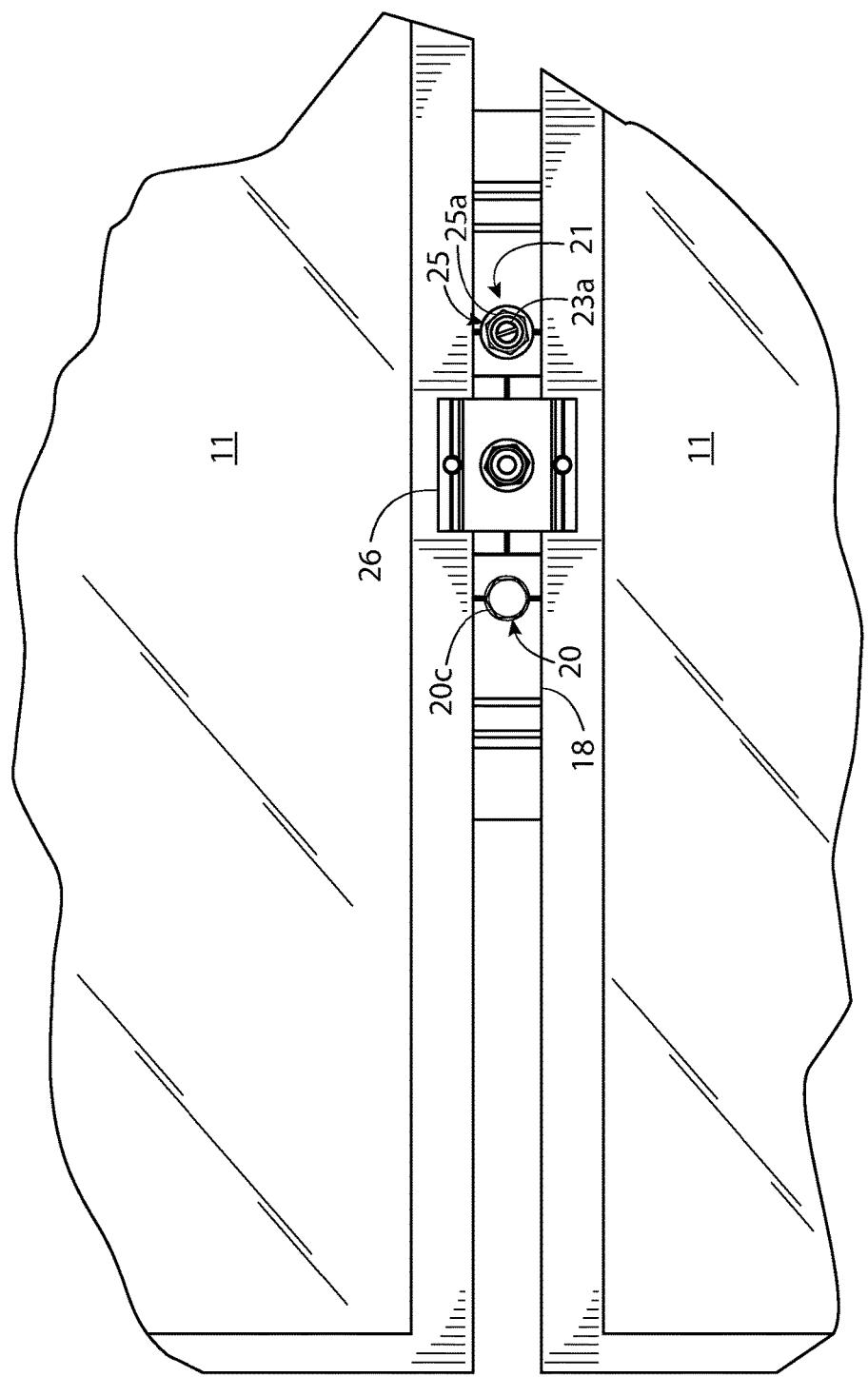
FIG. 16 illustrates an enlarged partial view of FIG. 1 in top plan view, showing the height-adjuster and dual-locking mechanism between two solar panels.

While other rail-less mounting apparatus allow for positional movement along one direction of the roof surface 13 and for height-adjustment, the solar panel mounting device 12 shown in FIGS. 1-15 of this disclosure does so in unique way and has several advantages. First, the solar panel mounting device 12 has a single mechanism that can independently lock the height-adjustment and the sliding mechanism. As seen in FIGS. 4A-4D, 7-10, this dual-locking mechanism 21 is separate from the height-adjuster 20 and the mechanism also acts as a guide and support surface as the height-adjuster 20 moves the pedestal 18 up and down. Second, the maximum limit for the height-adjustment (i.e. a maximum distance between the solar panel 11 and the roof surface 13) is lockable or settable, and once locked, prevents upward movement of the solar panel 11. Third, a portion of the dual-locking mechanism 21 acts as a slidable-support as the height-adjuster 20 moves the solar panel 11 away from the roof surface 13. Fourth, the height-adjuster 20 and dual-locking mechanism 21 are positioned between solar panels 11 so they are easy for the installer to adjust. The discussion for FIGS. 4A-4D, 5A, and 5B, and will describe this in detail showing typical steps for adjusting the height and movement along the roof-line. FIG. 13 represents these typical steps in flow chart form. The discussion for FIG. 16 will show from a top plan view, the position of the height-adjuster 20 and the dual-locking mechanism 21. The discussion, which follows for FIGS. 4A-16 illustrate the solar panel mounting device 12 in an embodiment with FIGS. 4A-4D, 5A, 5B, and 6-12, and 16 showing the solar panel mounting device 12 in various views and FIGS. 14 and 15 showing a detail view of a one possible end-clamp mounting arrangement. While some figures, show an end-clamp 27 or a mid-clamp 26, the principles of operation that embody the sliding, height-adjustment, and locking and unlocking features remain the same.

Referring to FIGS. 4A-4D, 5A and 5B, 6-12, the solar panel mounting device 12 includes a base 15 and an upper assembly 17 slidable along the base 15. The upper assembly 17 can include a platform 16 that receives the solar panel 11 (FIGS. 4A-4D, 5A, 5B, and 11-12), a pedestal 18, and a slider 19. that captively slides along the length-wise direction of the base 15. The upper assembly 17 includes a height-adjuster 20 that adjusts the height of the solar panel 11, platform 16, and pedestal 18 relative the roof surface 13. Referring to FIGS. 4A-4D, and 7-10, the height-adjuster 20 includes a threaded portion 20a that threadably engages a threaded aperture 18a, 18b (FIGS. 7-10) in the pedestal 18, a non-threaded portion 20b, that freely engages non-threaded aperture 19a, 19b (FIGS. 7-10) in the slider 19, and a tool-engaging portion 20c. The height-adjuster 20 can vertically pass through non-threaded apertures 19a, 19b (FIGS. 7-10) in the slider 19 where a retainer 22 can secure it to the slider 19. The retainer 22 can be a threaded nut that engages a threaded end portion of the height-adjuster 20, a cotter pin engaging an aperture through the diameter of the height-adjuster 20, a retaining clip engaging a groove in the height-adjuster 20 or other equivalent retaining hardware. Alternatively, the retainer 22 could be eliminated by swaging or flanging the end of the height-adjuster 20 so it cannot be removed from the slider 19. Referring to FIGS. 4A-4D, as the height-adjuster 20 turns, it threadably engages the pedestal 18, remains fixed to the slider 19 via the retainer 22, and moves the pedestal 18 with respect to the base 15 and the slider 19.

The upper assembly 17 also includes a dual-locking mechanism 21 that locks and unlocks the upper limit of the height-adjustment, separately locks and unlocks slidably of the upper assembly 17 along the base 15, and helps stabilize height-adjustment. Like the height-adjuster 20, the dual-locking mechanism 21 can be positioned vertically through the upper assembly 17. The height-adjuster 20 and the dual-locking mechanism 21 can be positioned on opposing sides of the center-line of the solar panel mounting device 12 to provide the possibility of easier adjustment as compare with a centered mechanism, especially once the solar panels 11 are positioned in place. Referring to FIGS. 4A-4D, and 7-10, the dual-locking mechanism 21 (FIGS. 4A-4D), includes a threaded fastener 23, a threaded retainer 24, and a through-hole standoff 25. The threaded fastener 23 includes a tool-engaging portion 23a such as an Allen-head, Philips, torx, slot head or another tool-engaging pattern. The threaded fastener 23 shown is a threaded rod and the tool-engaging portion 23a with a slot head. Referring to FIGS. 7-10, the through-hole standoff 25 shown includes a threaded interior through-hole (not shown), an unthreaded exterior body 25b, and a tool receiving head 25a. The through-hole standoff 25 threadably engages the threaded fastener 23 through the threaded interior through-hole, and freely engages the pedestal 18 through an unthreaded aperture 18c and aperture 19e in the slider 19.

The threaded retainer 24 can be slidably captive within an upward-facing channel 15a of the base 15. The threaded retainer 24 threadably engages the threaded fastener 23 and captures the threaded retainer 24 in slidable cooperation within a lower cavity 15b of the upward-facing channel 15a. The threaded retainer 24 can have any shape that keeps it from rotating within the lower cavity 15b of the upward-facing channel 15a and any size that is wider than the channel opening 15c above the lower cavity 15b. For example, the threaded retainer 24 can have a rectangular or parallelogram profile placed length-wise within lower cavity 15b.

The slider 19 captively slides the platform 16 and the pedestal 18 along a length-wise direction of the base 15 by engaging the first hook arm 19c and second hook arm 19d positioned length-wise along the slider 19 captively slide the slider 19, platform 16, and the pedestal 18 along a first groove 15e and a second groove 15d positioned length-wise along the base 15. The first groove 15e and the second groove 15d can be opposing inward facing c-shapes, and the first hook arm 19c and the second hook arm 19d can be opposing outward facing L-shapes, as illustrated. This combination allows the slider 19 to slide along the base 15 but restricts either upward or downward movement. The first hook arm 19c and the second hook arm 19d have different lengths to allow the slider 19 to rest on the upward-facing channel 15a that projects upward from the base 15. The upward-facing channel 15a can be wider at a lower cavity 15b than at its upward-facing opening.

Figure 4A:
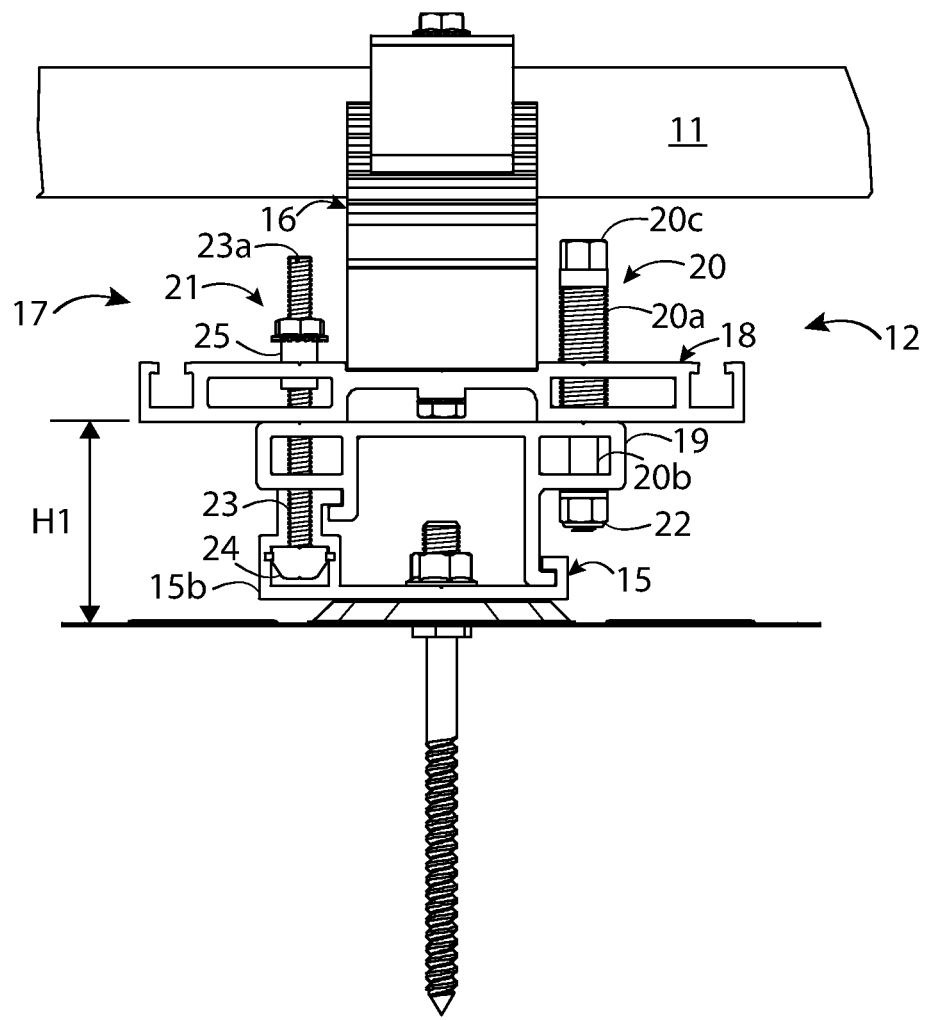
FIG. 4A illustrates an enlarged partial view of FIG. 3 taken along boundary IV, the pedestal and platform are set to a minimum height from the base; the pedestal and platform are free to slide along the base and free to move upward away from the base.

Referring to FIGS. 4A-4D, 5A-5B, and 13 together demonstrate the operation of the solar panel mounting device 12. Referring to FIG. 13, a typical adjustment process can include four steps, labeled 40-41. In step 41, unlocking the slide lock and adjusting the position of the panel along the roof-line. For example, in FIG. 5B the solar panel 11 and the upper assembly 17 slides along the base 15 from a position in FIG. 5A a travel distance D1 out of a total possible travel distance D in FIG. 5A. Note that the total travel distance D can be the length of the solar panel mounting device 12. A rail stop, clip, or other restriction devices can restrict the travel distance D if required. In FIG. 4A, the upper assembly 17 is free to move along the rail because the threaded fastener 23 of the dual-locking mechanism 21 engages the threaded retainer 24 but does not engage the bottom of the lower cavity 15b. The through-hole standoff 25 is a height-adjustment stop. Positioning the threaded fastener 23 above the pedestal 18, for example, as illustrated, unlocks the height-adjustment.

Figure 4B:
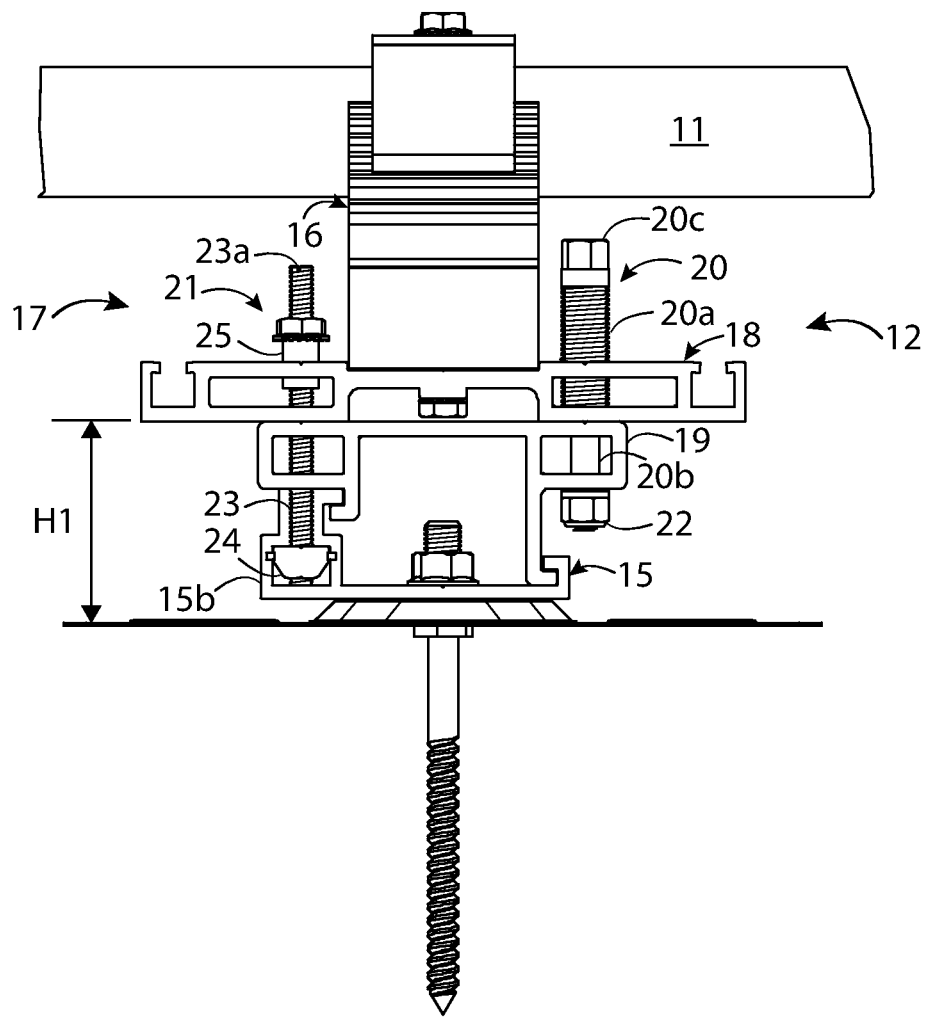
FIG. 4B illustrates the solar panel mounting device of FIG. 5A where the pedestal and platform are locked from sliding.

Referring to FIGS. 4B and 13 in step 42 (FIG. 13), the dual-locking mechanism 21 locks the upper assembly 17 from sliding along the base 15. Referring to FIG. 4B, the upper assembly 17 cannot move along the rail because the threaded fastener 23 of the dual-locking mechanism 21 engages the threaded retainer 24 and engages the bottom of the lower cavity 15b. For example, in FIG. 4B, a tool, such as a screw driver or Allen wretch, can engage the tool-engaging portion 23a and screw the threaded fastener 23 into the bottom of the lower cavity 15b. As discussed for FIG. 4A, the height-adjustment lock can act independently from the sliding lock. Positioning the threaded fastener 23 above the pedestal 18, for example, as illustrated, unlocks the height-adjustment.

Figure 4C:
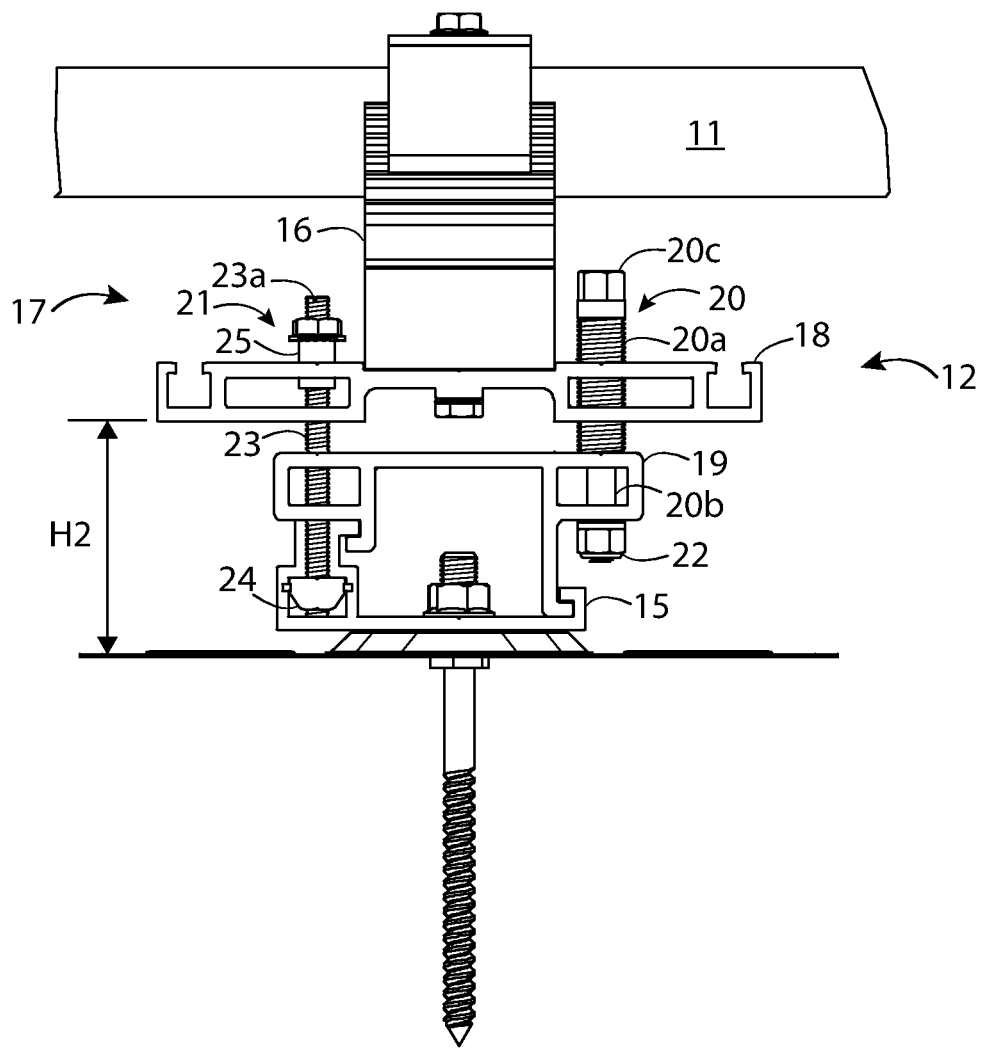
FIG. 4C illustrates the solar panel mounting device of FIG. 5A where the pedestal, platform, and solar panel located at higher from the base than in FIGS. 4A and 4B, and locked from sliding.

Referring to FIGS. 4C and 13 in step 43 (FIG. 13), the height-adjuster 20 adjusts the height of the solar panel 11, platform 16, and pedestal 18. The height of the pedestal 18 from the roof surface 13 is H2 as compared with height H1 in FIGS. 4A and 4B (i.e. the spaced relationship between the pedestal 18 and the roof surface 13 changes). The height-adjuster 20, by rotatable engagement with the pedestal 18 and the slider 19, causes the pedestal 18 and the solar panel 11 to move a distance relative to the slider 19, the base 15, and the roof surface 13. In FIG. 4C, the threaded portion 20a of the height-adjuster 20 threadably engages the pedestal 18 but freely rotates within the slider 19 as previously discussed. The installer typically uses a tool to engage the tool-engaging portion 20c of the first vertical adjuster. For example, if the tool-engaging portion 20c uses a hex bolt head pattern, then the installer could use a socket wrench, box wrench, or open end wrench, or combination wrench. If the tool-engaging portion 20c uses a hex screw head, then the installer could use an Allen wrench or hex key. Threadably engaging the pedestal 18 with the height-adjuster 20 causes the pedestal 18 to move relative to the slider 19 and the base 15. In this case, the pedestal 18, platform 16, and solar panel 11 have moved upward compared with FIGS. 4A and 4B. Because the through-hole standoff 25 remains positioned above the pedestal 18, the height-adjustment remains unlocked.

Figure 4D:
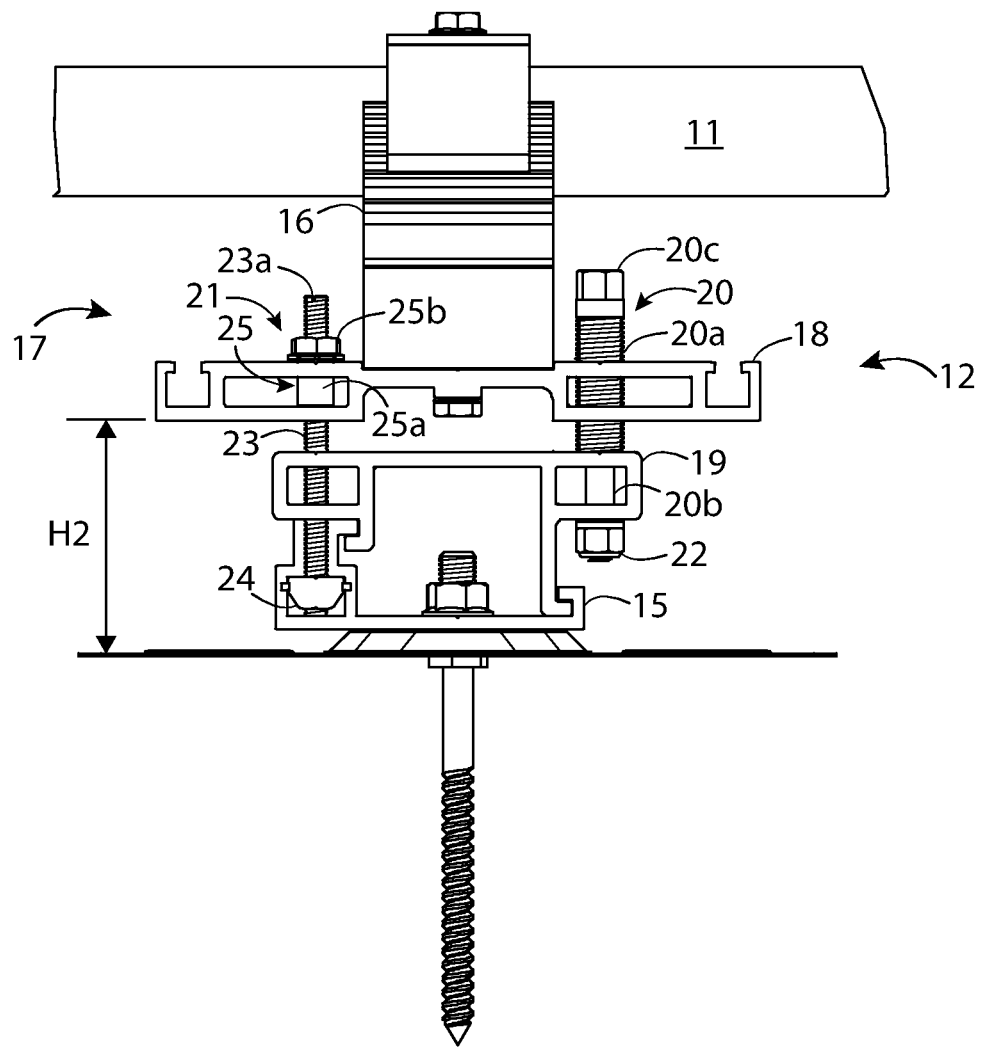
FIG. 4D illustrates the solar panel mounting device of FIG. 5A height-locked at the height shown in FIG. 4C and locked from sliding.
Figure 5A:
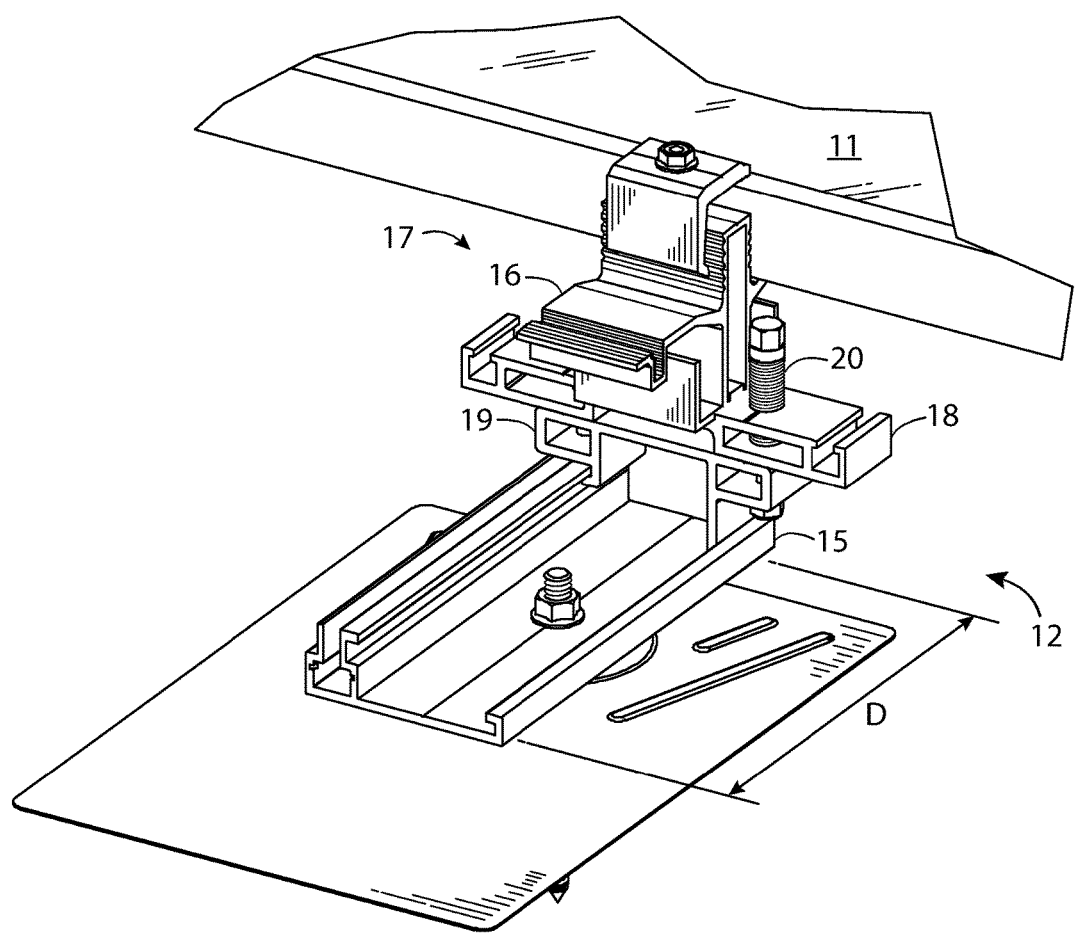
FIG. 5A illustrates an enlarged partial view of FIG. 1 taken along boundary V and in a first position along relative to a position along its base.
Figure 5B:
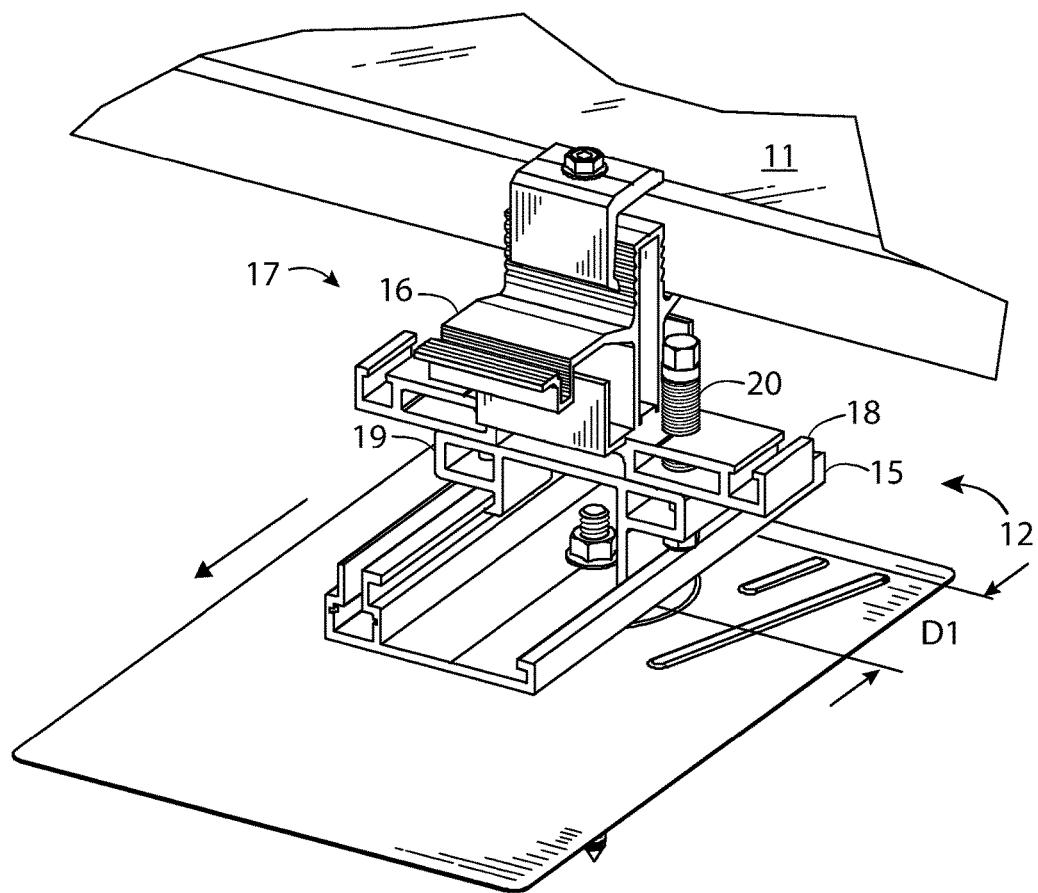
FIG. 5B illustrates shows the solar panel mounting device of FIG. 5A slid to a second position along its base.
Figure 6:
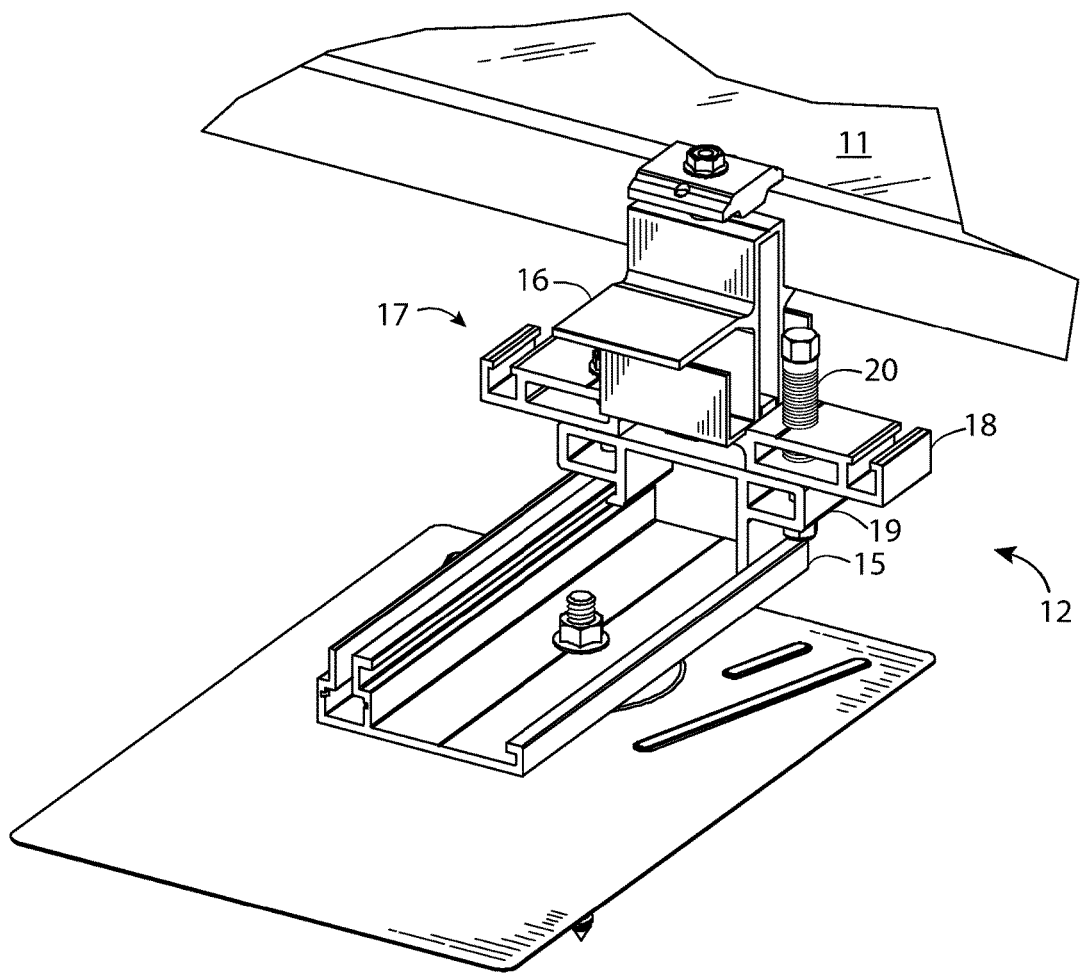
FIG. 6 illustrates an enlarged partial view of FIG. 1 taken along boundary VI.

Referring to FIGS. 4D and 13 in step 44 (FIG. 13), with the solar panel 11, platform 16, and pedestal 18, at the desired height relative to the roof, the dual-locking mechanism 21 locks height-adjustment. The through-hole standoff 25 can be screwed down along the threaded fastener 23 until the tool receiving head 25a of the through-hole standoff 25 rests against the top of the pedestal 18. This sets or locks the maximum height, or maximum limit of the distance, of the solar panel 11, platform 16, and the pedestal 18 relative to the slider 19, base 15, and roof surface 13 to prevent the pedestal 18 from moving upward during wind storms.

The adjustment and locking sequence outlined in FIG. 13 can be useful for efficiently installing arrays of solar panels. Height-adjustment, roof-line position adjustment, height and position locking of the solar panel mounting device 12 need not follow the sequence of steps described for FIG. 13. For example, height-adjustment first, followed by roof-line position adjustment, with both the position and height-locked in the final step.

The solar panel mounting device 12 illustrated in FIGS. 4A-4D and 7-10 offers several advantages over existing rail-less mounting systems. First, the maximum height-adjustment (i.e. the maximum distance between the pedestal 18 and slider 19) is lockable or settable, and once locked prevents upward movement of the solar panel 11. This helps prevent uplift and loosening during wind storms. Second, the height-adjustment and roof-line adjustment (i.e. sliding adjustment) are separately adjustable using the dual-locking mechanism 21. Third, the dual-locking mechanism 21 is physically separate from the height-adjuster 20. Fourth, the height-adjuster 20 and dual-locking mechanism 21 are positioned on opposing sides of the center-line of the solar panel mounting device 12. Referring to FIGS. 4A-4D and 16, this allows the height-adjuster 20 and the dual-locking mechanism 21 to be positioned for easy adjustment after the solar panel 11 is in place as compared with existing systems where the height-adjuster 20 is often positioned along the center-line of the mounting hardware. In addition, unthreaded exterior body 25b (FIG. 4D) provides an additional benefit of providing a stabilizing secondary support surface for the pedestal 18 as the height-adjuster 20 threadably engages the pedestal 18. The tool receiving head 25a (FIGS. 4D and 16) of the through-hole standoff 25 (FIG. 4A-4D), the tool-engaging portion 23a of the threaded fastener 23 (FIGS. 4A-4D), and the 20c engaging portion of the height-adjuster 20 are all exposed and accessible between the solar panels 11. In FIGS. 4A-4D, this helps prevent the threaded portion 20a of the height-adjuster 20 from binding against the threading of the pedestal 18.

Figure 7:
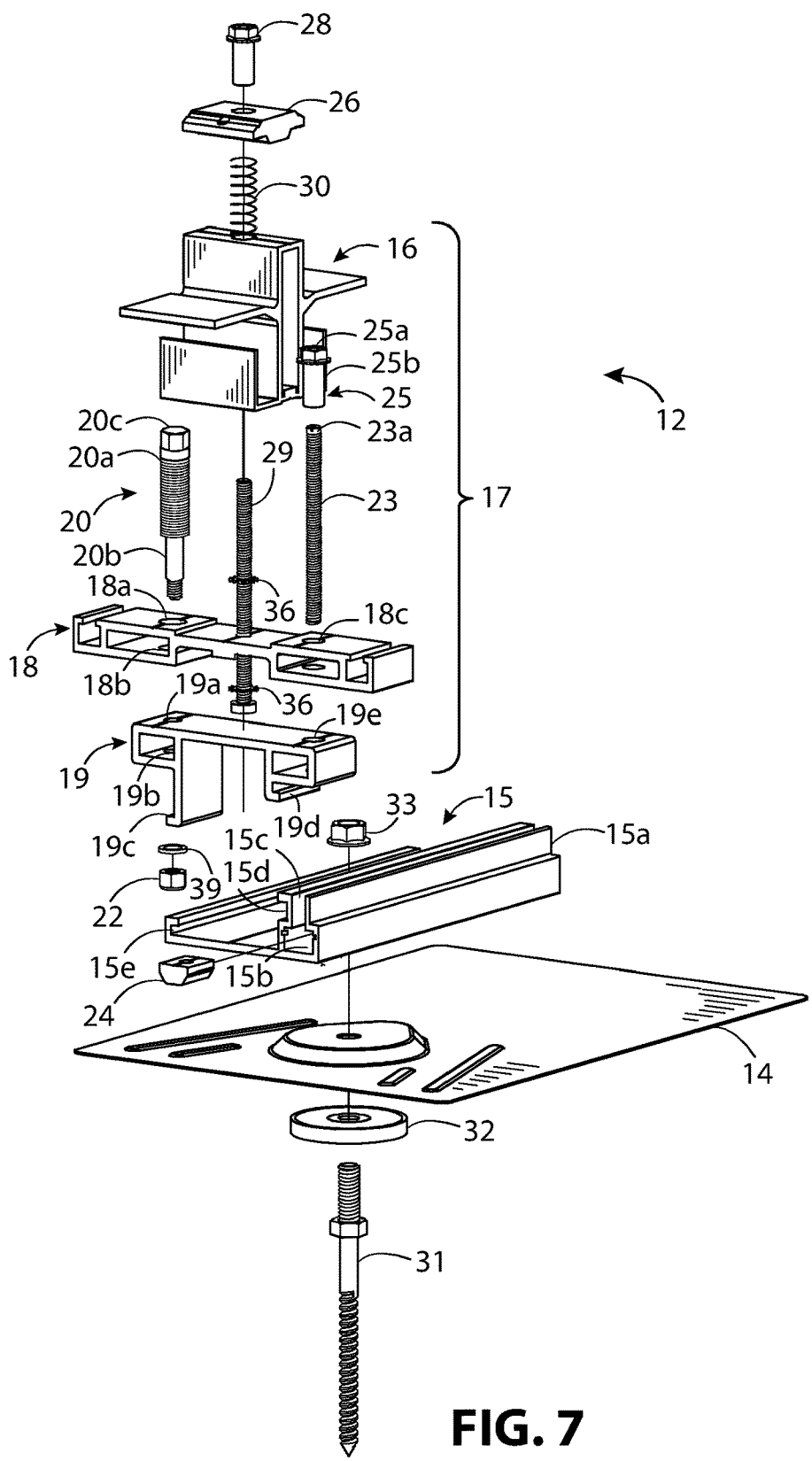
FIG. 7 illustrates the solar panel mounting device of FIG. 1 utilizing a mid-clamp, in exploded perspective view
Figure 8:
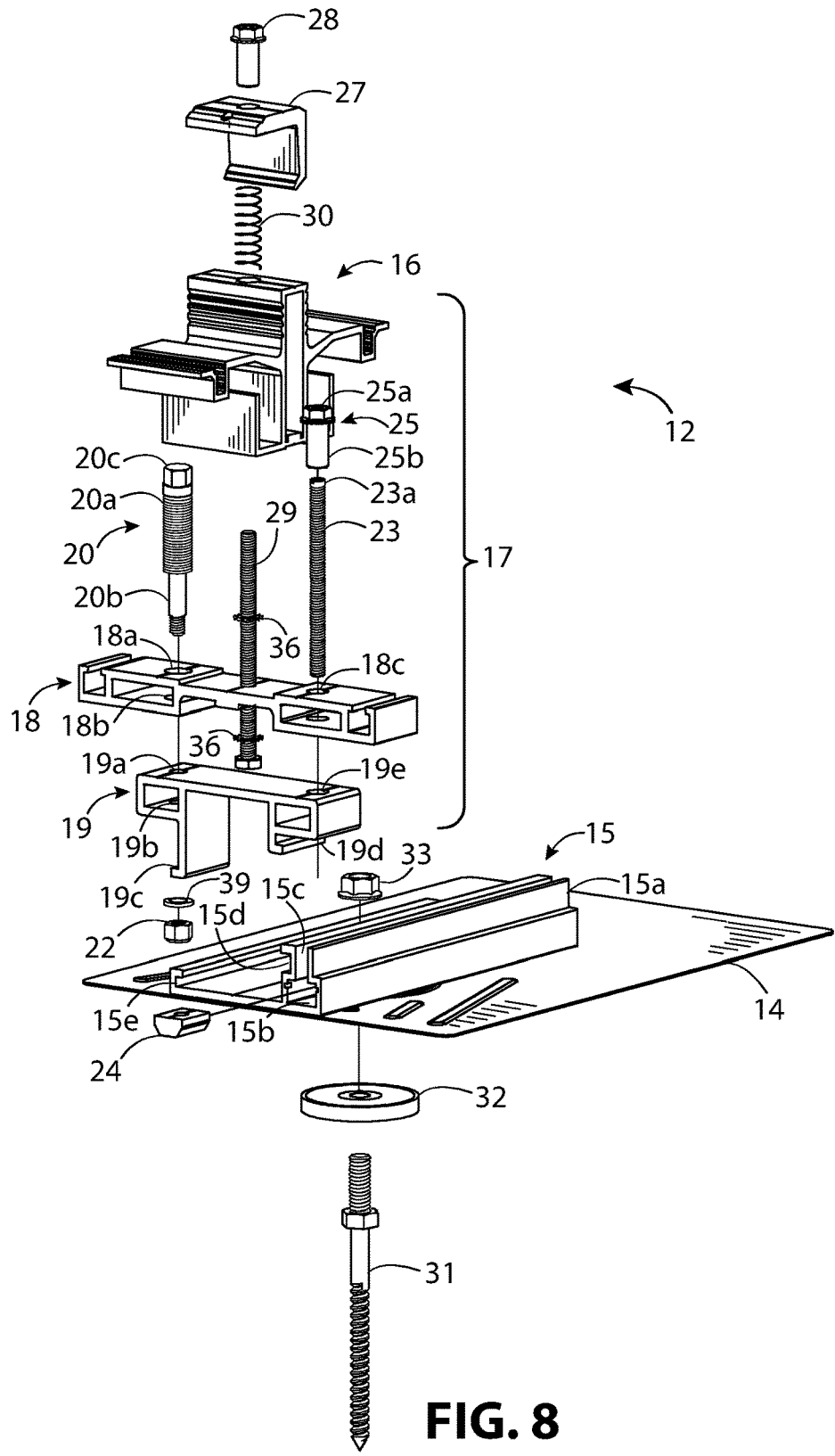
FIG. 8 illustrates the solar panel mounting device of FIG. 1 utilizing an end-clamp, in exploded perspective view

Referring to FIGS. 7-12, a clamping device, such as the end-clamp 27 (FIGS. 8, 10, and 11) or the mid-clamp 26 (FIGS. 7, 9, and 12), can secure the solar panel 11 (FIGS. 11 and 12) to the solar panel mounting device 12 via a threaded receiver 28 in combination with a threaded fastener 29 (FIGS. 7, 8, 11, and 12). The threaded receiver 28 can be a nut, a collar nut, or as illustrated, a through-hole standoff, with a tool receiving head, a threaded interior and a smooth exterior surface. The threaded fastener 29 can be a bolt, screw, threaded rod or other threaded fastener that mates with the threaded receiver 28. A spring 30 (FIGS. 7, 8, 11, and 12), can help facilitate assembly by keeping either the mid-clamp 26 or the end-clamp 27 above the solar panel 11 as the solar panel mounting device 12 receives the solar panel 11. As illustrated in FIGS. 7 and 8, the threaded fastener 29 can engage the threaded receiver 28 through a platform 16 and a pedestal 18, with the head of the threaded fastener 29 resting upwardly against the bottom of the pedestal 18. Alternatively, the threaded fastener 29 could be a threaded rod engaging a threaded blind hole at the top of the pedestal 18.

As previously discussed, and as illustrated in FIGS. 7-10, flashing 14 can optionally secure the base 15 to the roof. A hanger bolt 31 can attach the base 15 to the flashing 14 via a nut 33 or equivalent threaded retainer. The hanger bolt 31 can engage the roof, typically via a rafter or joist. A gasket 32 positioned under a recess in the flashing 14, and a nut 33 provides leak resistance. The gasket 32 is typically a flexible water proof or water resistant material that can withstand exposure to the elements, such as ethylene propylene diene monomer (EDPM). While the roof attachment device can be a flashing assembly, for example, as described, the roof attachment device can be other than a flashing assembly. For example, the roof attachment device can be the applicant's equipment mounting assembly of U.S. Pat. No. 8,136,311. Note that the roof attachment device or mechanism for mounting the solar panel mounting device 12 to the roof is not critical and is not relevant to the unique operational features of the solar panel mounting device 12 described.

Figure 10:
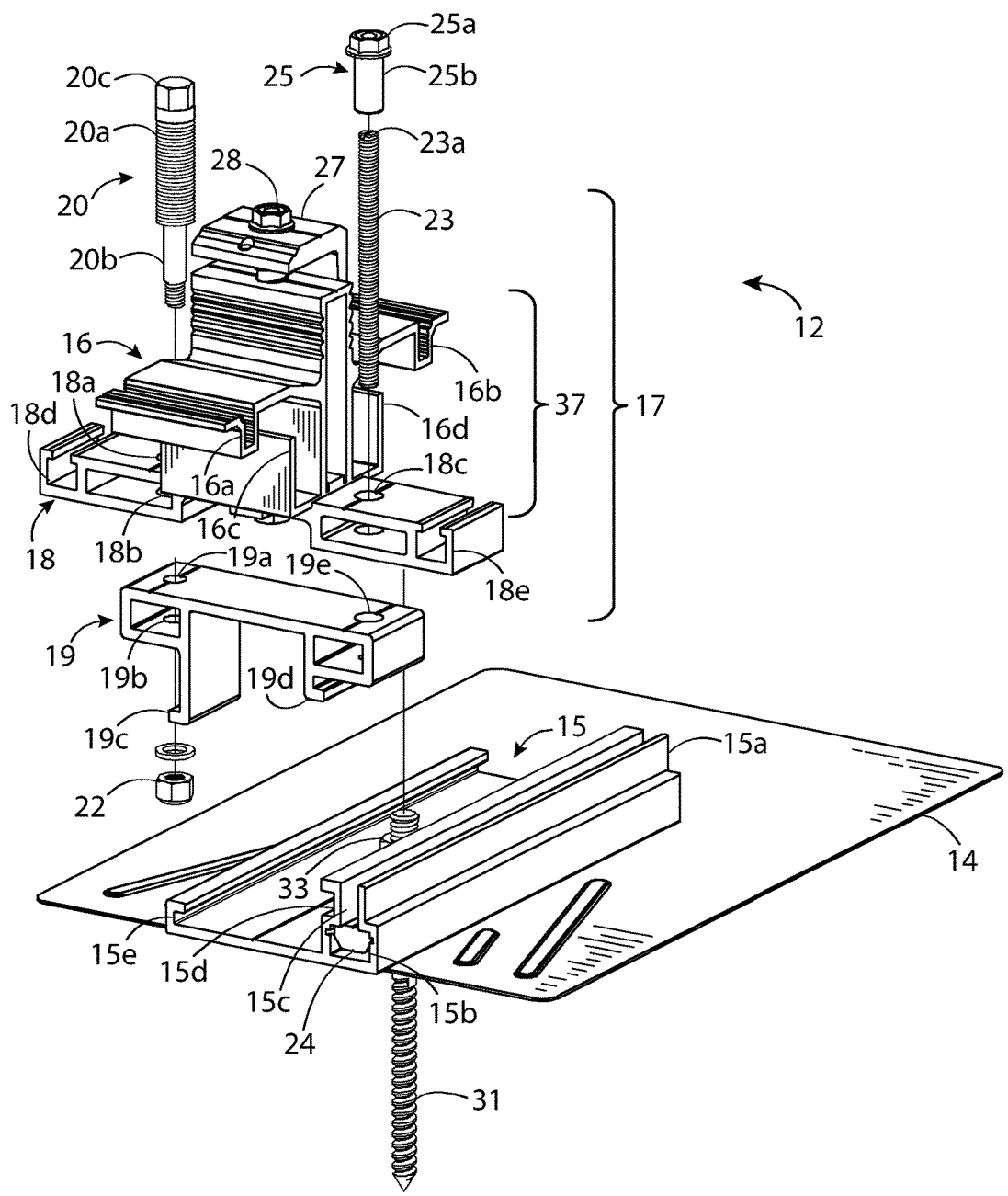
FIG. 10 illustrates the solar panel mounting device of FIG. 8 showing the base attached to roof flashing, in partially exploded perspective view.
Figure 11:
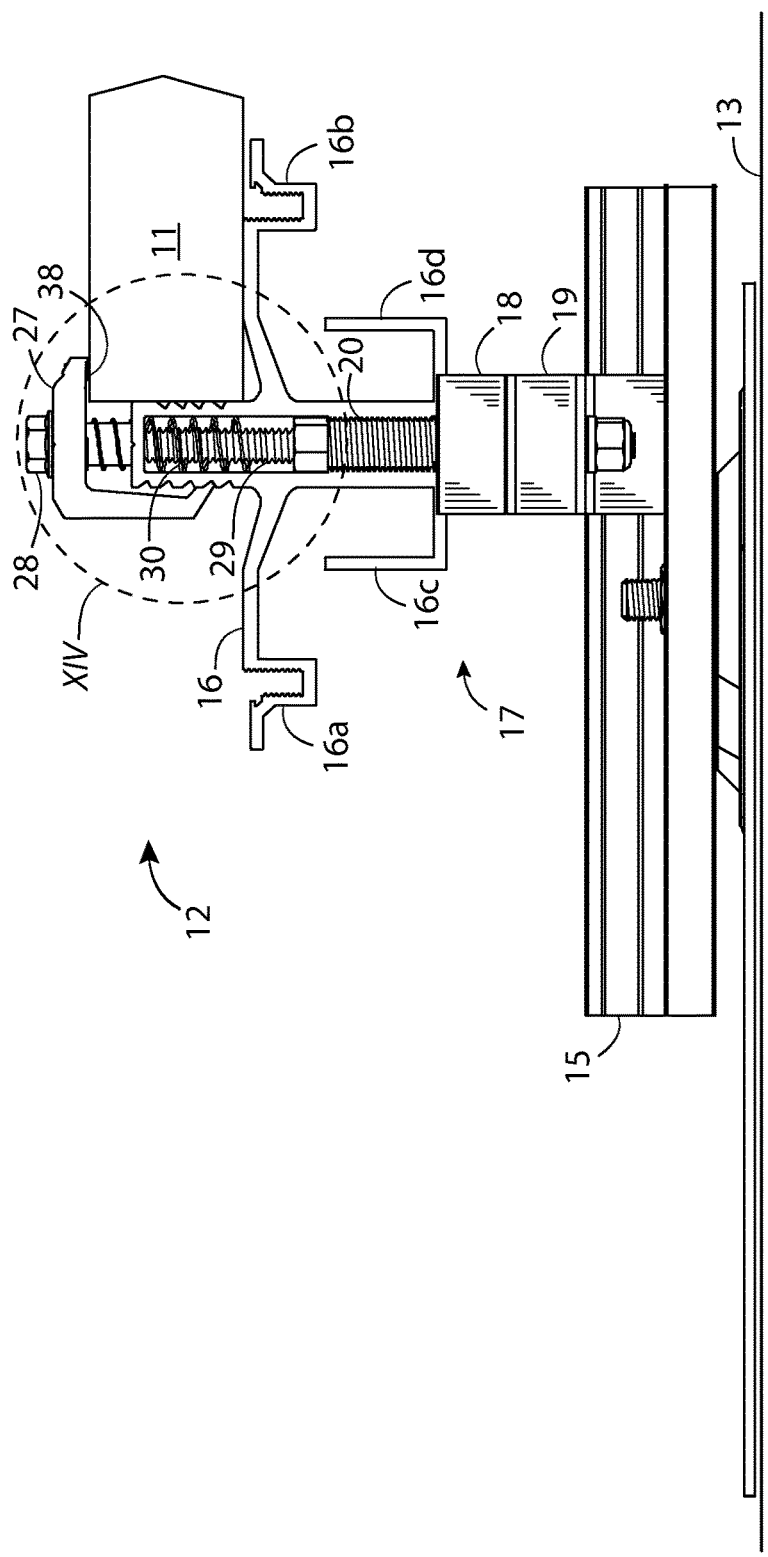
FIG. 11 illustrates an enlarged partial view of FIG. 3 taken along boundary XI.

The pedestal 18 and the platform 16 can be configured to attach accessories. For example, in FIGS. 10 and 11, the platform, as illustrated, includes auxiliary mounts 16a, 16b. These auxiliary mounts 16a, 16b could be used to mount an inverter, power optimizer, or other accessary at the edge of the solar panel array where one on the auxiliary mounts would remain exposed. The auxiliary mounts 16a, 16b can include ridges that engage the threads of threaded fasteners such as screws or bolts. Alternatively, the auxiliary mounts could be shaped like a rail channel with a narrow groove at the top and wider cavity at the bottom. For example, the auxiliary mounts 18d, 18e on opposing edges of the top surface of the pedestal 18 illustrated in FIG. 10. These auxiliary mounts can accept the head of a fastener such as a bolt or t-bolt and hold the fastener in slidable captive cooperation and attach the threaded end of the fastener to a bracket or to the accessory itself. In FIGS. 10-12, wires can be routed and managed through wire management channels 16c, 16d.

FIGS. 14 and 15 show an example of an end-clamp assembly that could be use with the solar panel mounting device 12. This end-clamp assembly features three-angle bearing surfaces described in U.S. patent application Ser. No. 15/130,913 by the inventor. FIG. 14 illustrates and enlarged partial view of FIG. 4 taken along boundary XIV showing the end-clamp assembly in greater detail. FIG. 15 illustrates an enlarged partial view of FIG. 14 showing the three-angled bearing surface in greater detail. FIGS. 14 and 15, show a portion of the solar panel 11, the platform 16, end-clamp 27, threaded receiver 28, threaded fastener 29, spring 30 all in combination as previously described. The end-clamp 27 includes an upper clamping portion 27a, a mid-portion 27b, and an end portion 27c. The platform 16 includes an alignment portion 35 that projects directly and perpendicularly upward from the platform 16. The alignment portion 35 includes outside surfaces 35a, 35b (FIG. 14) parallel to each other. The outside surfaces 35a, 35b are each illustrated with grooves 35c that extend along their length.

To secure the solar panel 11, the threaded receiver 28 engages the threaded fastener 29 and tightens the upper clamping portion 27a against the top of the solar panel 11 thereby securing the solar panel 11 co-planarly against the outside surface 35a and the platform 16. The end-clamp 27 will tend to rotate as the threaded receiver 28 and the threaded fastener 29 tightens as illustrated by the counter-clockwise rotational lines. To keep the upper clamping portion 27a from binding against the solar panel 11, the clamping portion contact surface is manufactured with a slight inward angle with respect to the top surface of the upper clamping portion 27a. The angle A can typical be between 1-2 degrees and is sufficient to allow for rotation of the clamping portion contact surface into a position co-planar with the top of the solar panel 11 as the threaded receiver 28 tightens into the threaded fastener 29.

Referring to FIG. 15, the end portion 27c, can extend obliquely and directly away from the mid-portion 27b, and terminates into a three-angle bearing surface 27d. As illustrated, the three-angle bearing surface 27d engages co-planarly against both the outside surface 35a and the groove 35c of the alignment portion 35. The three-angle bearing surface 27d includes a first planar bearing surface 27e, a second planar bearing surface 27f, and a third planar bearing surface 27g. The first planar bearing surface 27e directly and obliquely extends from an upward-facing outside surface 27h of the end portion 27c and aligns vertically against the outside surface 35a of the alignment portion 35. The second planar bearing surface 27f extends directly and obliquely from the first planar bearing surface 27e. The third planar bearing surface 27g extends directly and at an angle of 90-degrees or less with respect to the second planar bearing surface 27f and terminates at a downward facing outside surface 27i of the end portion 27c, making an oblique angle. The upward-facing outside surface 27h faces upward and inward with respect to the alignment portion 35. The downward facing outside surface 27i faces downward and outward with respect to the alignment portion 35.

The groove 35c is complementary in shape to the combination of the second planar bearing surface 27f and the third planar bearing surface 27g with the groove 35c including first planar groove surface 35d and a second planar groove surface 35e. The first planar groove surface 35d co-planarly receives the second planar bearing surface 27f and second planar groove surface 35e co-planarly receives the third planar bearing surface 27g.

Solar panels 11 can come in different thicknesses according to manufacturer or other factors. One of the advantages of the end-clamp assembly of FIGS. 14 and 15 is that the grooves 35c can be set to specific positions based on industry standard solar panel thicknesses. This eliminates the need for the solar panel racking system manufacturer or installers to stock different end-clamps or bases for different solar panels. It also eliminates ambiguity, thus reducing installation time, and installation error, by only providing discrete height settings corresponding to common panel thicknesses.

While FIGS. 14 and 15 describe a particular end-clamp assembly, the inventors envision that the solar panel mounting device 12 used throughout this disclosure can use various end-clamps known in the art. The unique height-adjustment and sliding features do not require or depend on a particular style or type of end-clamp assembly.

Solar panel mounting systems generally require proper electrical grounding to operate safely and meet local and national regulatory requirements. One challenge in a height-adjustable and slidable solar panel mounting system is to provide a reliable electrical ground path through the components. While the platform 16, the pedestal 18, the slider 19, and the base 15 can all be made from an electrically conductive material such as cast or extruded aluminum, mere surface contact between the components does not ensure a good electrical connection. In general, aluminum builds up an oxide coating on the surface of the parts that resists electrical conduction. Referring to FIGS. 7-10, 11, 12, and 14 the solar panel 11 (FIGS. 11, 12, and 14), the end-clamp 27 (FIGS. 7, 9, 11, and 14) or mid-clamp 26 (FIGS. 8 and 10), and threaded receiver 28 form an electrical ground path with the platform 16, pedestal 18, and base 15 through the threaded fasteners 23, 29, washers 36, and through-hole standoff 25.

Figure 9:
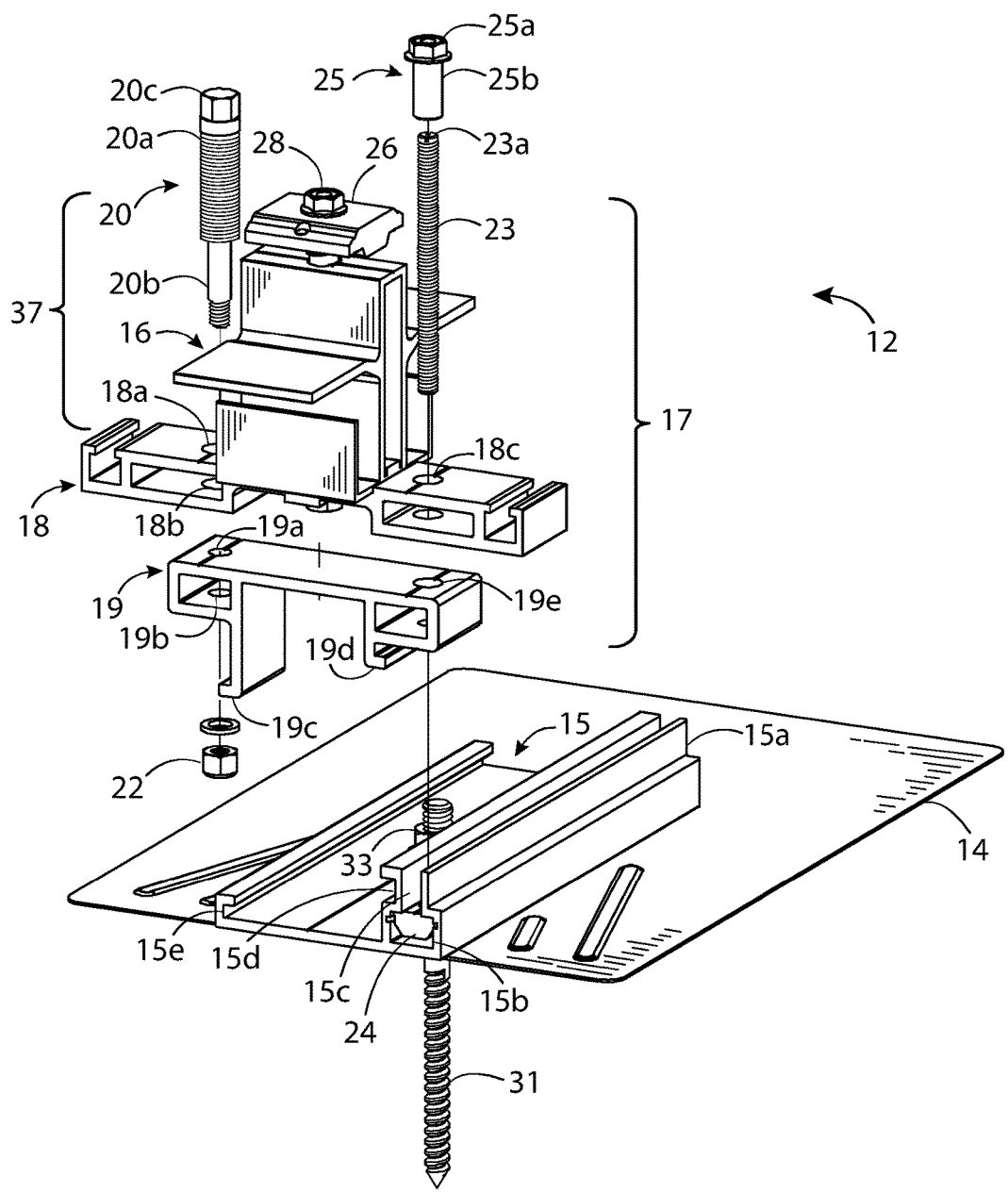
FIG. 9 illustrates the solar panel mounting device of FIG. 7 showing the base attached to roof flashing, in partially exploded perspective view.

Referring to FIGS. 11 and 14, the end-clamp 27 includes a grounding pin 38 projecting from the underside of the upper clamping portion 27a. With sufficient force from tightening of the end-clamp 27, the grounding pin 38 penetrates the oxide coating of the frame of the solar panel 11 creating an electrical connection. The head of the threaded receiver 28 can have an underside with a rough or spiked surface that when tightened against the end-clamp 27 breaks the oxide layer and forms an electrical path. Referring to FIG. 8 the threaded fastener 29 and washers 36 form an electrical path between platform 16 and the pedestal 18. The washers 36 break the oxide coating and typically are star washers or spring washers. The conductive path can be completed to the base 15 through the threaded fastener 23 in combination with the through-hole standoff 25 and the pedestal 18 when both the solar panel mounting device 12 is both height-locked and slidably locked. In the slidably locked position, the threaded fastener 23 can press against the lower cavity 15b with sufficient force to break the oxide layer. In the height-locked position, the tool receiving head 25a can press against the pedestal 18 with sufficient force to break the oxide layer on the surface of the pedestal 18 if the underside of the tool receiving head 25a is sufficiently rough or spiked. In addition, the slider 19 can be grounded through height-adjuster 20 and the pedestal 18 via washer 39 and retainer 22. Note that the discussion of grounding mostly focused on solar panel mounting device 12 with an end-clamp 27 (FIGS. 8, 10, and 11), the same principles and implementation details apply to solar panel mounting devices 12 with a mid-clamp 26 (FIGS. 7, 9, and 12).

This disclosure has described a solar panel mounting system 10 and solar panel mounting device 12. It is not the intent of this disclosure to limit the claimed invention to the examples, variations, and exemplary embodiments described in the specification. Those skilled in the art will recognize that variations will occur when embodying the claimed invention in specific implementations and environments. For example, as viewed in FIGS. 11-12, the platform 16 the shape of the platform 16 allows the solar panels 11 to tilt into place under the end-clamp 27 (FIG. 11) or mid-clamp 26 (FIG. 12). Other platforms without this shape or feature could be use and are still within the scope of the solar panel mounting device 12 of this disclosure. For example, a flat platform, a rectangular platform, an elliptical platform, or a circular platform. As discussed for FIGS. 7-10, how the solar panel mounting device 12 is attached to the roof surface 13 does not affect the disclosed height-adjustment, roof-line sliding adjustment, and locking features. While the platform 16 and pedestal 18 illustrated are separate pieces, and can be joined together as a pedestal assembly 37 (FIGS. 9 and 10), a single integral pedestal can replace both the platform 16 and pedestal 18 or the pedestal assembly 37 in the described embodiments. While the shape of the base 15, platform 16, pedestal 18, and slider 19 illustrated, can be extruded, the can also be formed, cast, or forged.

It is possible to implement certain features described in separate embodiments in combination within a single embodiment. Similarly, it is possible to implement certain features described in single embodiments either separately or in combination in multiple embodiments. The inventor envisions that these variations fall within the scope of the claimed invention. For example, while there are some differences illustrated between alignment portion 35 (FIG. 14A) of the platform 16 in the examples using either the end-clamps 27 (FIGS. 7 and 9) or the mid-clamps 26 (FIGS. 8 and 10). It is possible to use the same platform 16 for both the end-clamps 27 and mid-clamps 26.

While the examples, exemplary embodiments, and variations are helpful to those skilled in the art in understanding the claimed invention, the claims that follow, and their equivalents, solely define scope of the claimed invention.

What is claimed is:

1. A device for mounting a solar panel to a roof surface, comprising:
    a base securable to the roof surface;
    a slider captively slidable along the base;
    a pedestal positioned above the slider;
    a height-adjuster and a dual-locking mechanism positioned on opposite sides of a center-line of the pedestal;
    the height-adjuster by rotatable engagement with the pedestal and the slider, causes the pedestal and the solar panel to move a distance relative to the slider, the base, and the roof surface; and
    the dual-locking mechanism slidably engages the base through the pedestal, is impingeable against the base to control sliding of the slider relative to the base, and is separately engageable with the pedestal to set a maximum limit for the distance.

2. The device of claim 1, further comprising:
    a platform configured to seat the solar panel;
    the pedestal positioned between the platform and the slider; and
    the height-adjuster by rotatable engagement with the pedestal and the slider causes the pedestal and the platform to move the distance relative to the slider, the base, and the roof surface.

3. The device of claim 1, further comprising:
    the base includes an upward-facing channel projecting directly upward from the base; and
    a threaded retainer threadably engages the dual-locking mechanism and captively slides within the upward-facing channel.

4. The device of claim 3, wherein:
    the dual-locking mechanism is impingeable against the upward-facing channel to control sliding of the slider relative to the base.

5. The device of claim 4, wherein:
    the base includes a first groove and a second groove; and
    the slider includes a first hook arm slidably engaging the first groove and a second hook arm slidably engaging the second groove.

6. The device of claim 1 wherein:
    the height-adjuster includes a threaded portion and a non-threaded portion; and
    the threaded portion threadably engages the pedestal and the non-threaded portion rotatably engages the slider causing the pedestal and the solar panel to move the distance relative to the slider, the base, and the roof surface.

7. The device of claim 1, wherein:
    the dual-locking mechanism and the pedestal in combination provide a slidable-support when adjusting the distance.

8. A device for mounting a solar panel to a roof surface, comprising:
    a base securable to the roof surface;
    a platform configured to seat the solar panel;
    a slider captively slidable along the base;
    a pedestal positioned between the platform and the slider;
    a height-adjuster and a dual-locking mechanism positioned on opposite sides of a center-line of the pedestal, the dual-locking mechanism includes a threaded fastener and a through-hole standoff;
    the height-adjuster by rotatable engagement with the pedestal and the slider causes the pedestal and the platform to move a distance relative to the slider, the base, and the roof surface;
    the threaded fastener slidably engages the base through the pedestal and the slider, is impingeable against the base to control sliding of the slider relative to the base; and
    the through-hole standoff threadably engageable with the threaded fastener to set a maximum limit for the distance.

9. The device of claim 8, further including:
    the base includes an upward-facing channel projecting directly upward from the base; and
    a threaded retainer threadably engages the through-hole standoff and captively slides within the upward-facing channel.

10. The device of claim 9, wherein:
    the through-hole standoff is impingeable against the upward-facing channel to control sliding of the slider relative to the base.

11. The device of claim 10, wherein:
    the base includes a first groove and a second groove; and
    the slider includes a first hook arm slidably engaging the first groove and a second hook arm slidably engaging the second groove.

12. The device of claim 9 wherein:
    the height-adjuster includes a threaded portion and a non-threaded portion; and
    the threaded portion threadably engages the pedestal and the non-threaded portion rotatably engages the slider causing the pedestal and the solar panel to move the distance relative to the slider, the base, and the roof surface.

13. The device of claim 8, wherein:
    the dual-locking mechanism and the pedestal in combination provide a slidable-support when adjusting the distance.

14. The device of claim 8, wherein:
the through-hole standoff and the pedestal in combination provide a slidable-support when adjusting the distance.

15. The device of claim 8, wherein:
the through-hole standoff includes an unthreaded exterior body and a threaded interior through-hole threadably engaging the threaded fastener; and
the pedestal includes an unthreaded aperture that rotatably engages the unthreaded exterior body.

16. The device of claim 15, wherein:
the unthreaded exterior body in combination with the unthreaded aperture provide a slidable-support when adjusting the distance.

\* \* \* \* \*